US012661984B2

(12) United States Patent
Nishizawa et al.

(10) Patent No.: US 12,661,984 B2
(45) Date of Patent: Jun. 23, 2026

(54) HEAD-UP DISPLAY DEVICE

(71) Applicant: Nippon Seiki Co., Ltd., Niigata (JP)

(72) Inventors: Kozo Nishizawa, Niigata (JP); Yuji Inosaka, Niigata (JP); Kazunari Hamada, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 308 days.

(21) Appl. No.: 18/694,025

(22) PCT Filed: Aug. 30, 2022

(86) PCT No.: PCT/JP2022/032529
§ 371 (c)(1),
(2) Date: Mar. 21, 2024

(87) PCT Pub. No.: WO2023/047897
PCT Pub. Date: Mar. 30, 2023

(65) Prior Publication Data
US 2024/0385435 A1 Nov. 21, 2024

(30) Foreign Application Priority Data

Sep. 21, 2021 (JP) ................................. 2021-153000

(51) Int. Cl.
*B60K 35/235* (2024.01)
*B60K 35/23* (2024.01)
(Continued)

(52) U.S. Cl.
CPC ............ *B60K 35/235* (2024.01); *B60K 35/23* (2024.01); *B60K 35/60* (2024.01); *B60K 37/20* (2024.01)

(58) Field of Classification Search
CPC ...... B60K 35/23; B60K 35/235; B60K 35/60; B60K 37/20; G02B 27/01
(Continued)

(56) References Cited

U.S. PATENT DOCUMENTS 11,675,190 B2 * 6/2023 Yuan .................. G02B 27/0103
359/13
2018/0157035 A1 6/2018 Fujita
(Continued)

FOREIGN PATENT DOCUMENTS

EP 3807696 A1 4/2021
JP 2010079169 A * 4/2010
(Continued)

OTHER PUBLICATIONS

International Search Report dated Oct. 18, 2022 issued in International Patent Application No. PCT/JP2022/032529, with English translation.

*Primary Examiner* — Jason S Daniels
(74) *Attorney, Agent, or Firm* — Rimon P.C.

(57) ABSTRACT

A head-up display device comprises a housing, a translucent cover, a display unit that displays an image, an optical system, and an imaging unit that is provided outside a path of display light of the image within the housing and has a light emitting element and an imaging element. When seen in plan view from above, the housing is disposed between a display light passing region through which the display light passes, and an imaging element region corresponding to the imaging element located below the translucent cover, and when seen from the occupant, the imaging element region is provided on the end side that is the side opposite to the center side of a vehicle in the width direction of the vehicle with respect to the display light passing region.

7 Claims, 11 Drawing Sheets

(51) Int. Cl.
  *B60K 35/60*     (2024.01)
  *B60K 37/20*     (2024.01)
(58) Field of Classification Search
  USPC ................................................ 296/37.12, 70
  See application file for complete search history.

(56)                    References Cited

U.S. PATENT DOCUMENTS

2023/0259204 A1*   8/2023   Yuan ................... B60K 35/654
                                                    345/156
2025/0036198 A1*   1/2025   Yuan ................... B60K 35/654

FOREIGN PATENT DOCUMENTS

| JP | 2011-152883 A | 8/2011 |
|----|---------------|--------|
| JP | 2017-134226 A | 8/2017 |
| JP | 2019-26198 A | 2/2019 |
| JP | 2022-56520 A | 4/2022 |
| WO | 2017/033566 A1 | 3/2017 |
| WO | 2019/238854 A1 | 12/2019 |

* cited by examiner

[FIG. 1A]
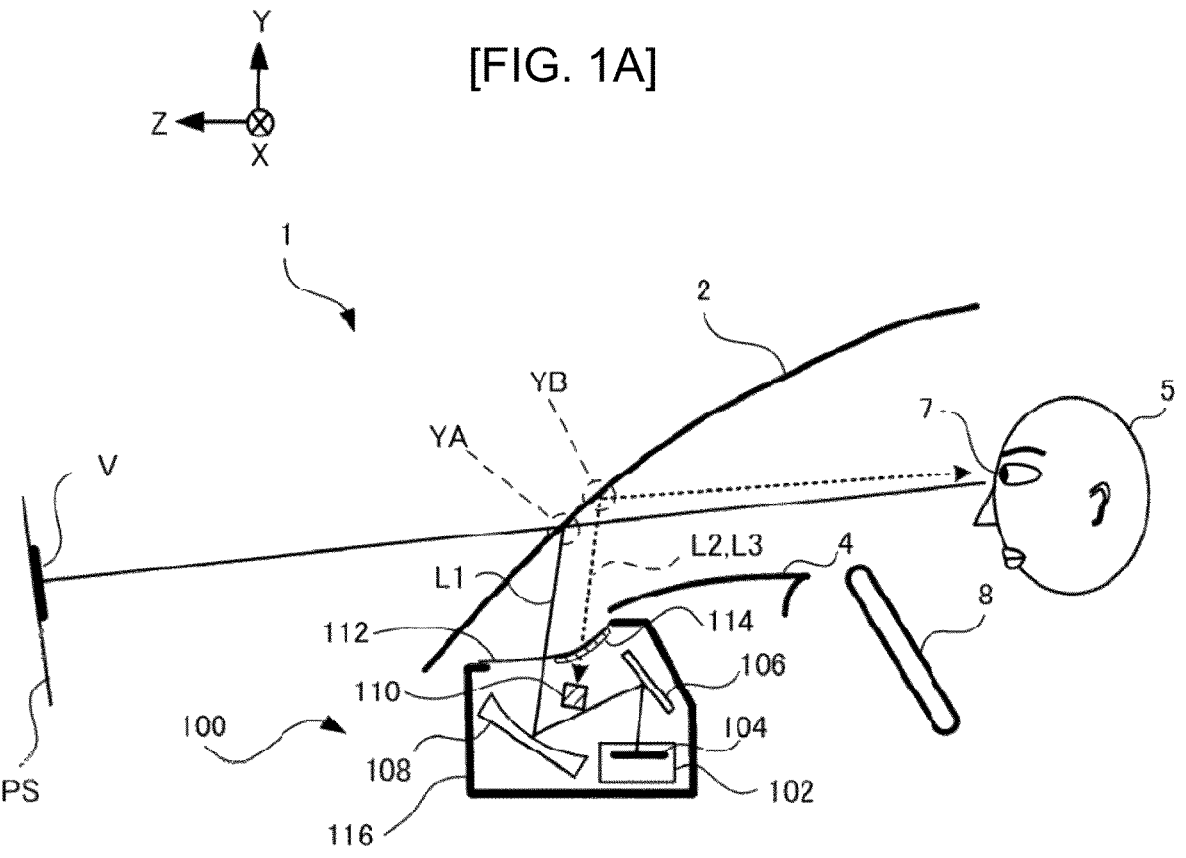
[FIG. 1B]
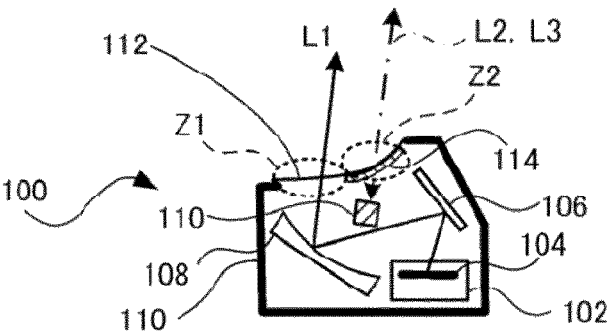

[FIG. 2A]
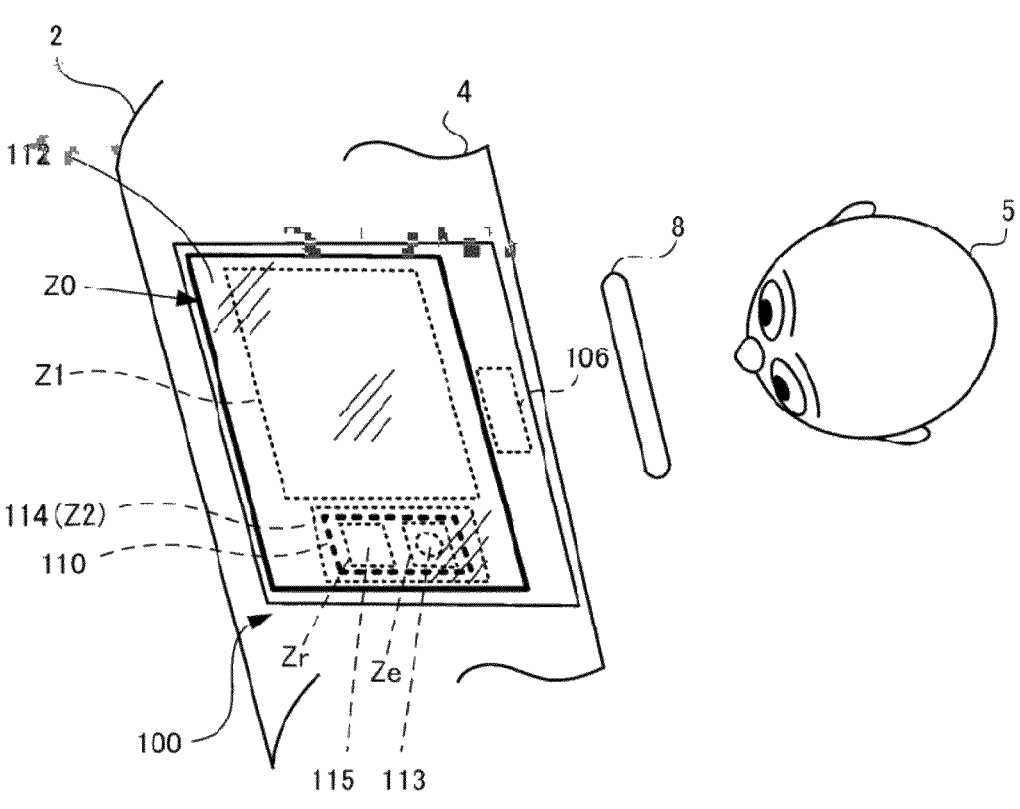
[FIG.2B]
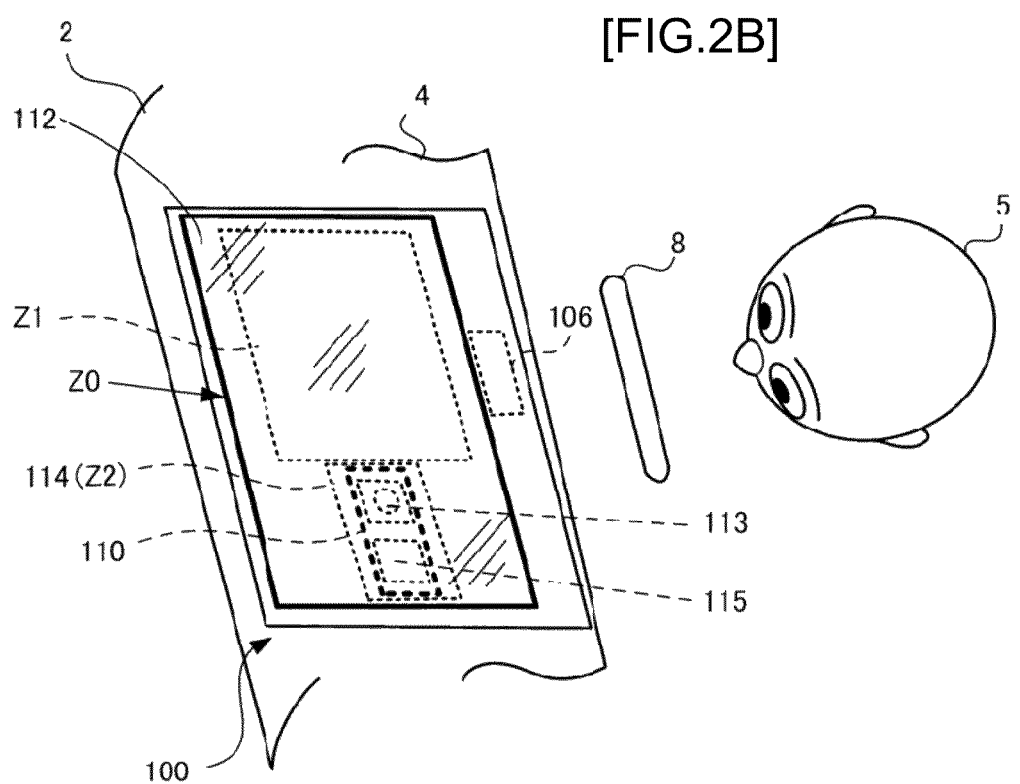

[FIG. 3A]
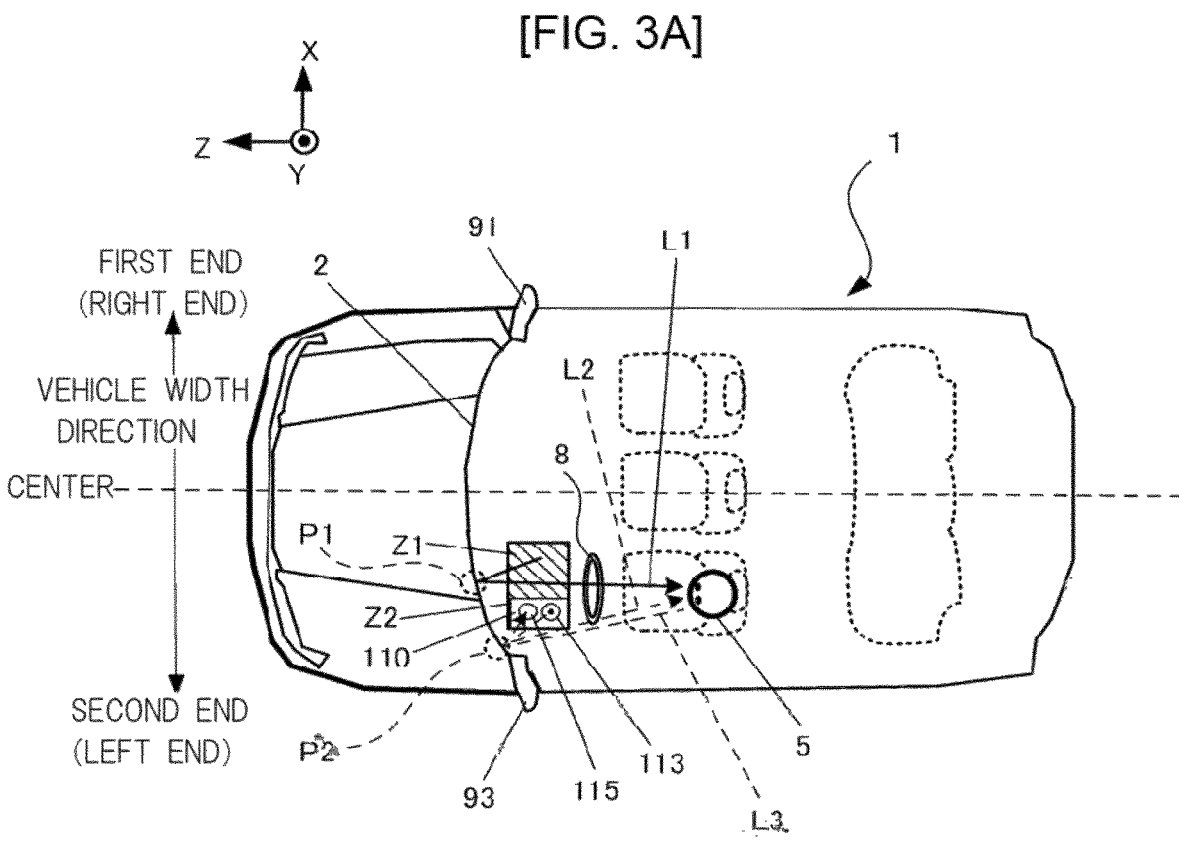
[FIG. 3B]

[FIG. 4A]
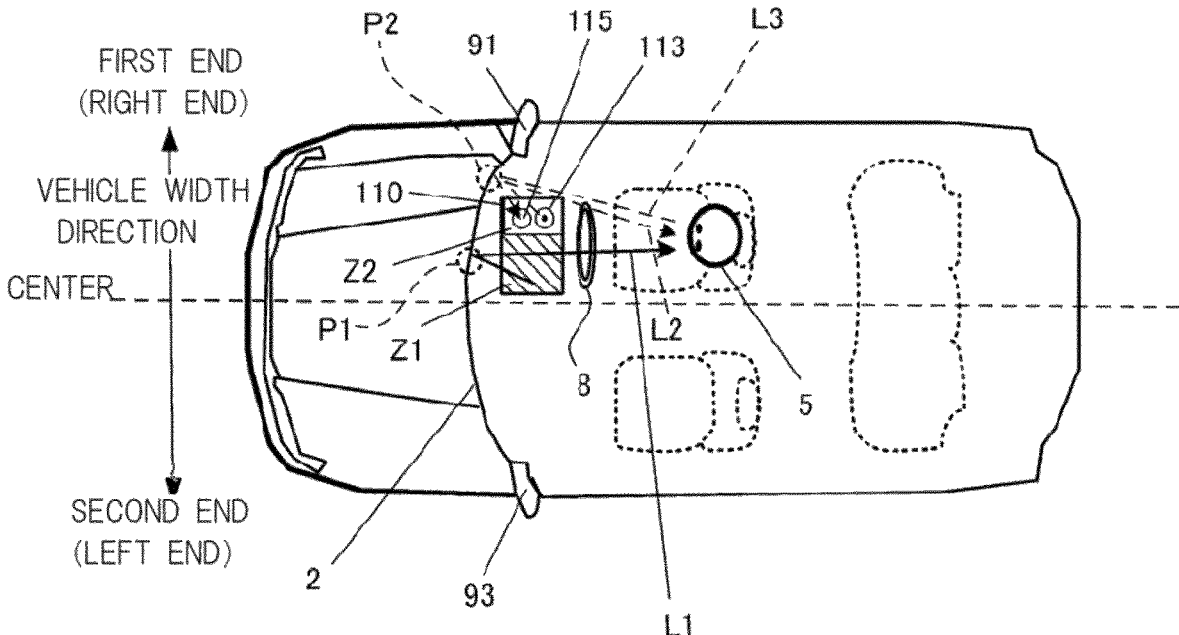
[FIG. 4B]
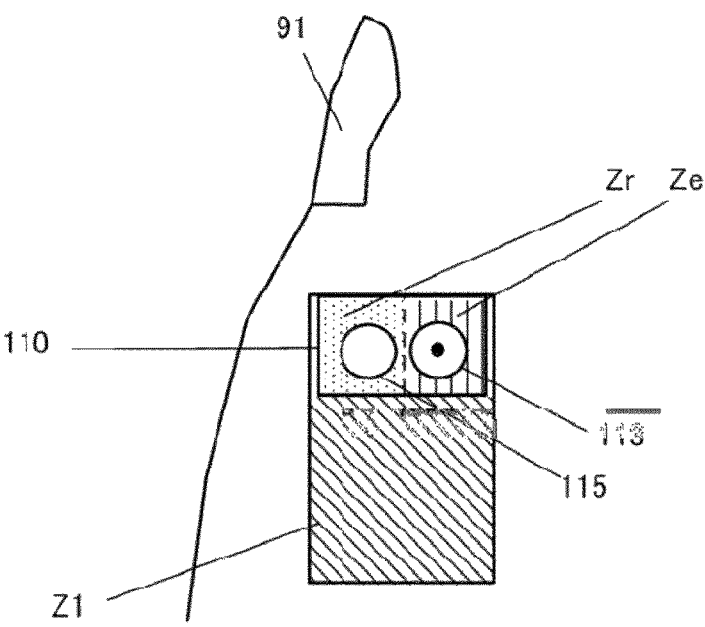

[FIG.5]
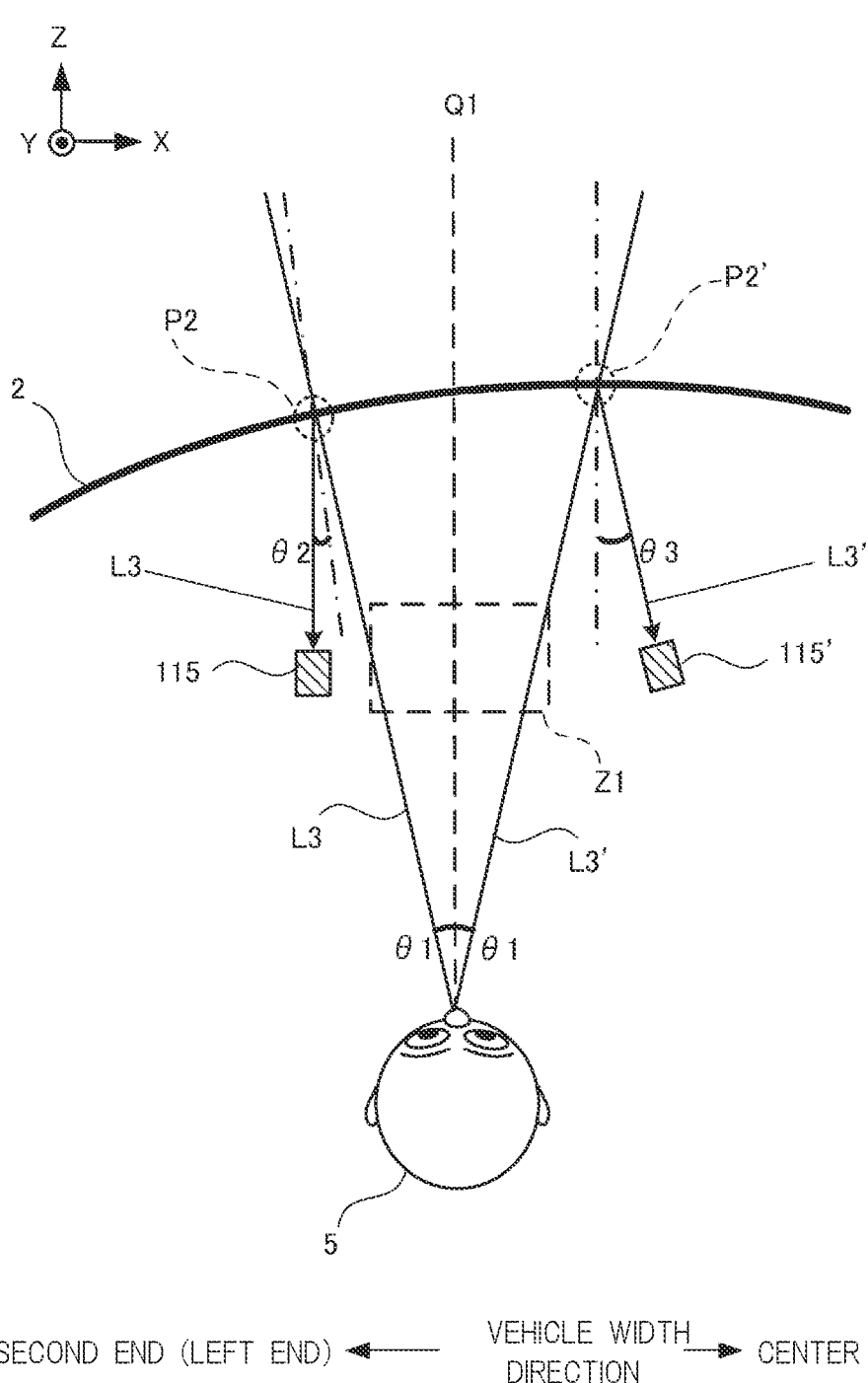
SECOND END (LEFT END) ◄────── VEHICLE WIDTH ──────► CENTER
                                   DIRECTION

[FIG.6]
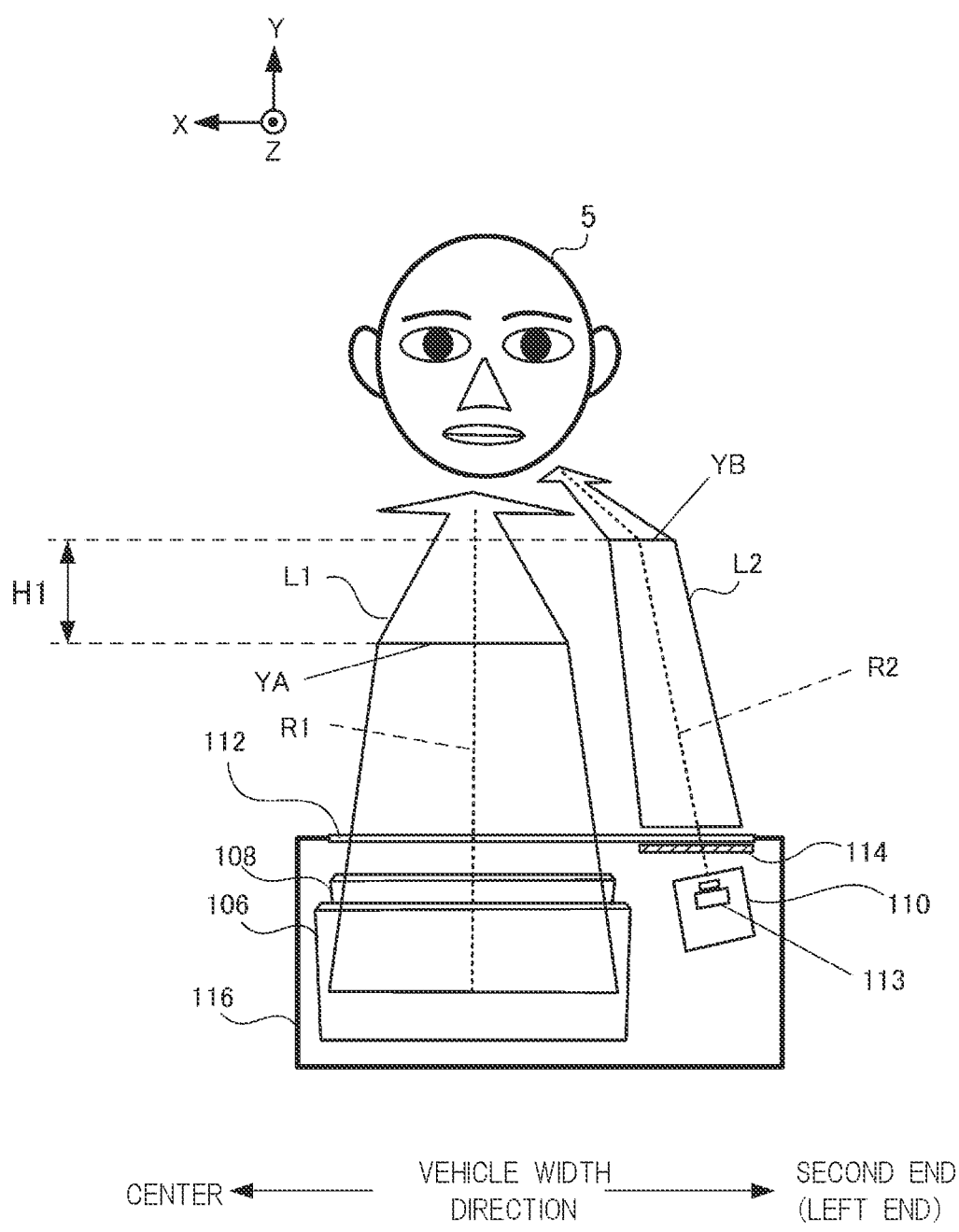

[FIG. 7A]
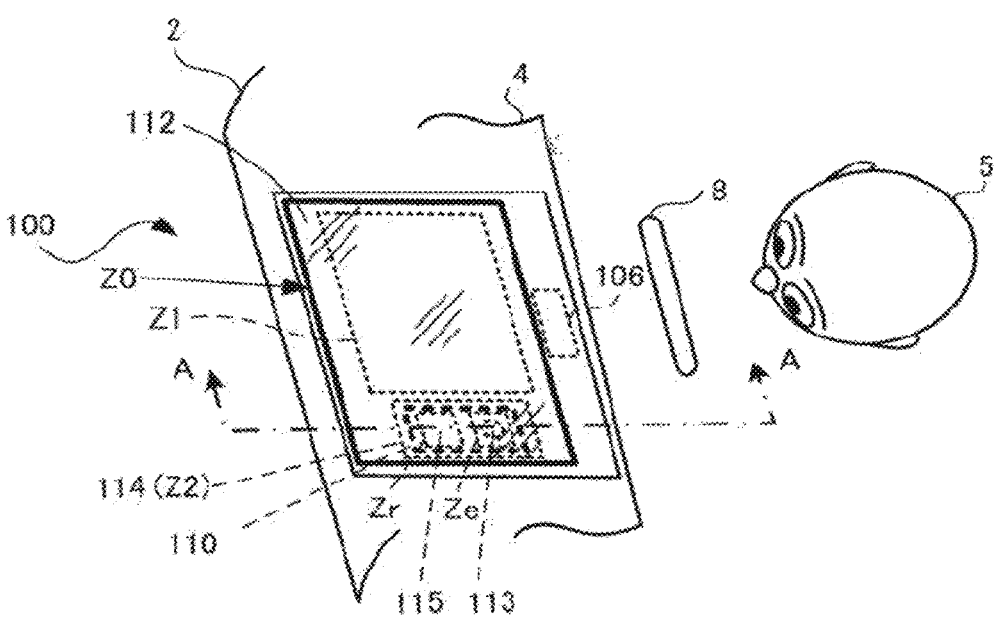
[FIG. 7B]
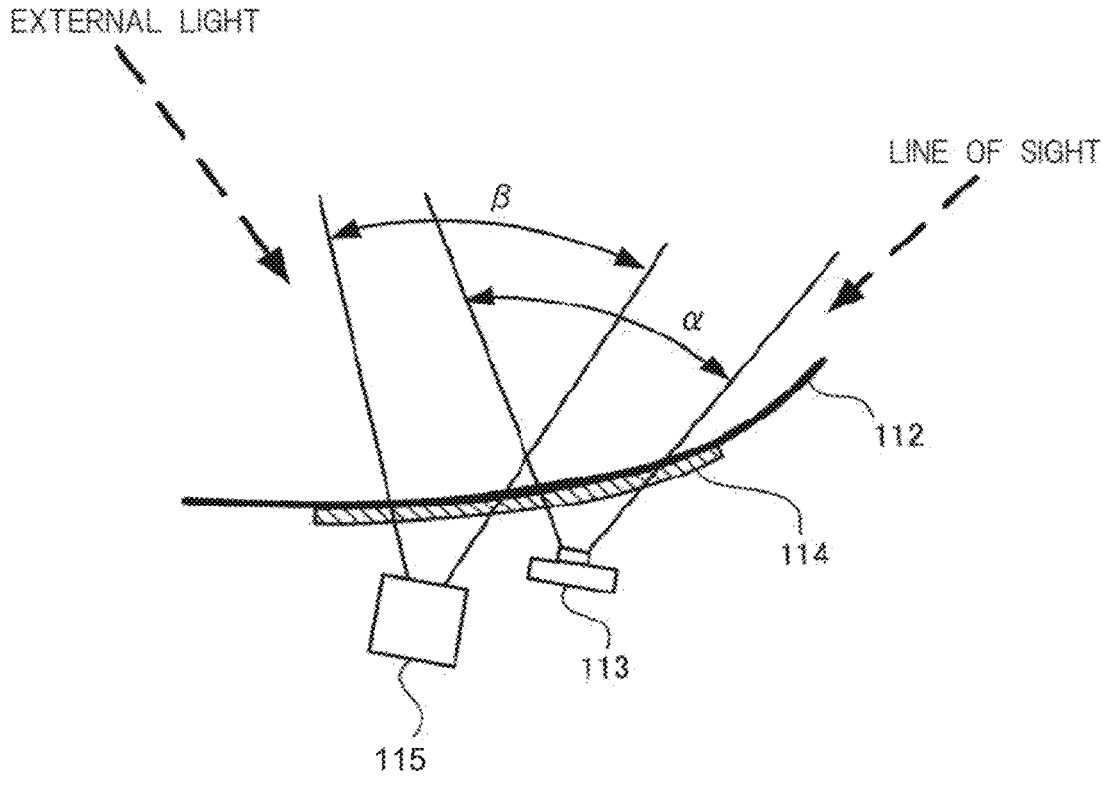

[FIG. 8A]
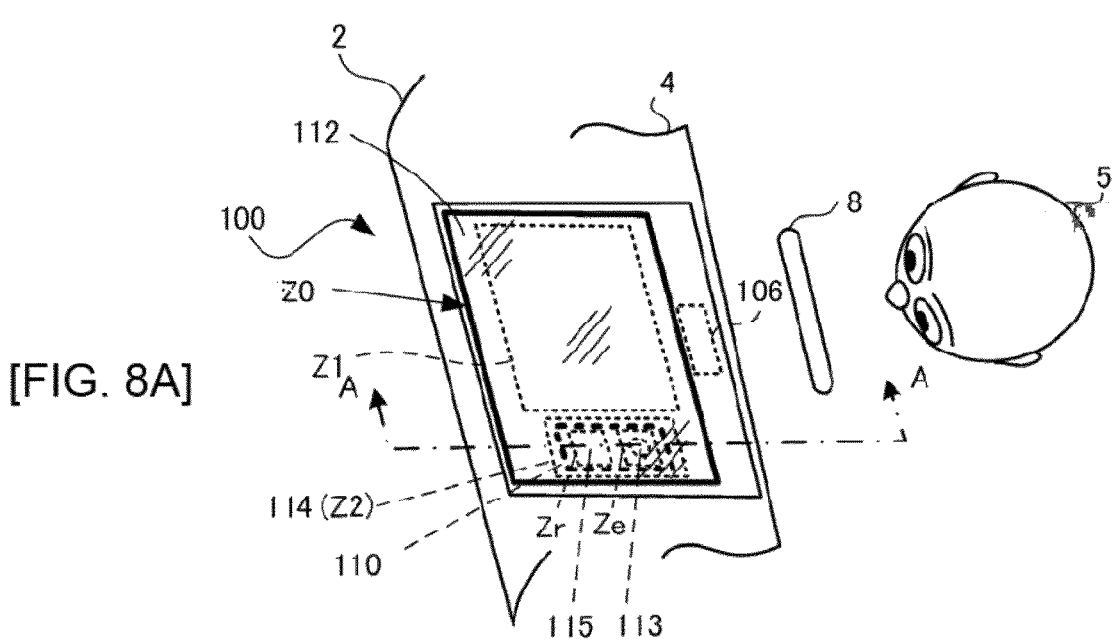
[FIG. 8B]
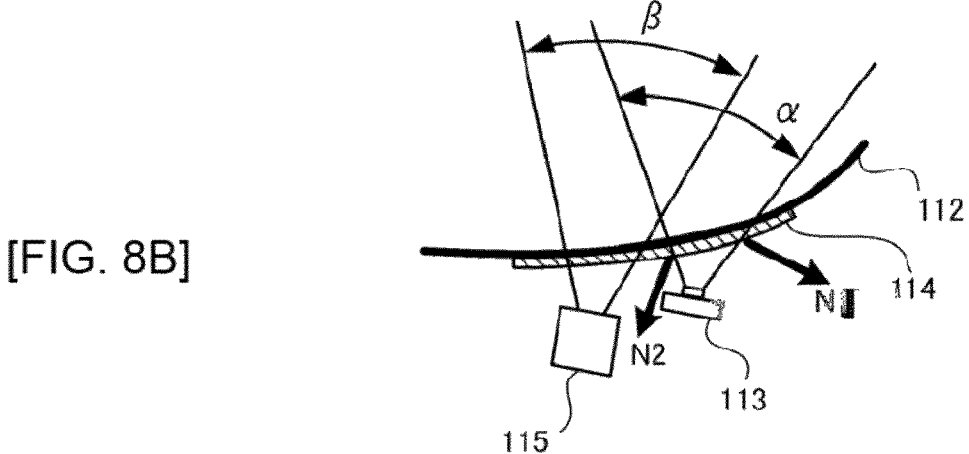
[FIG. 8C]
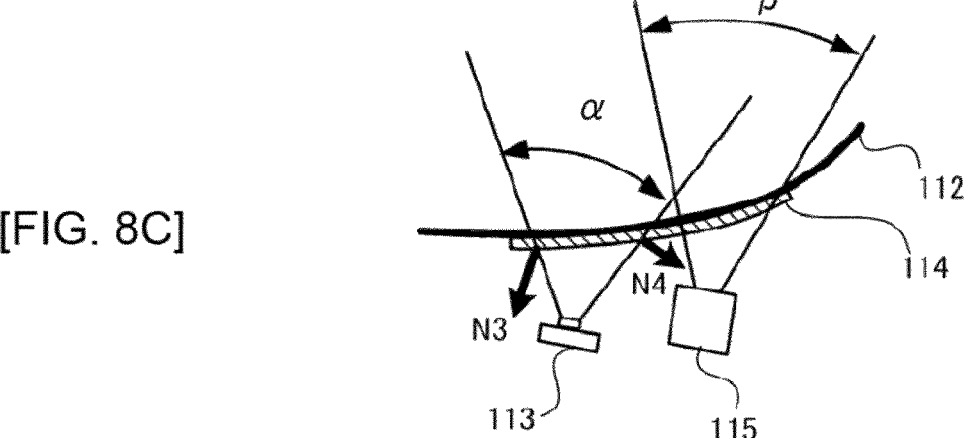

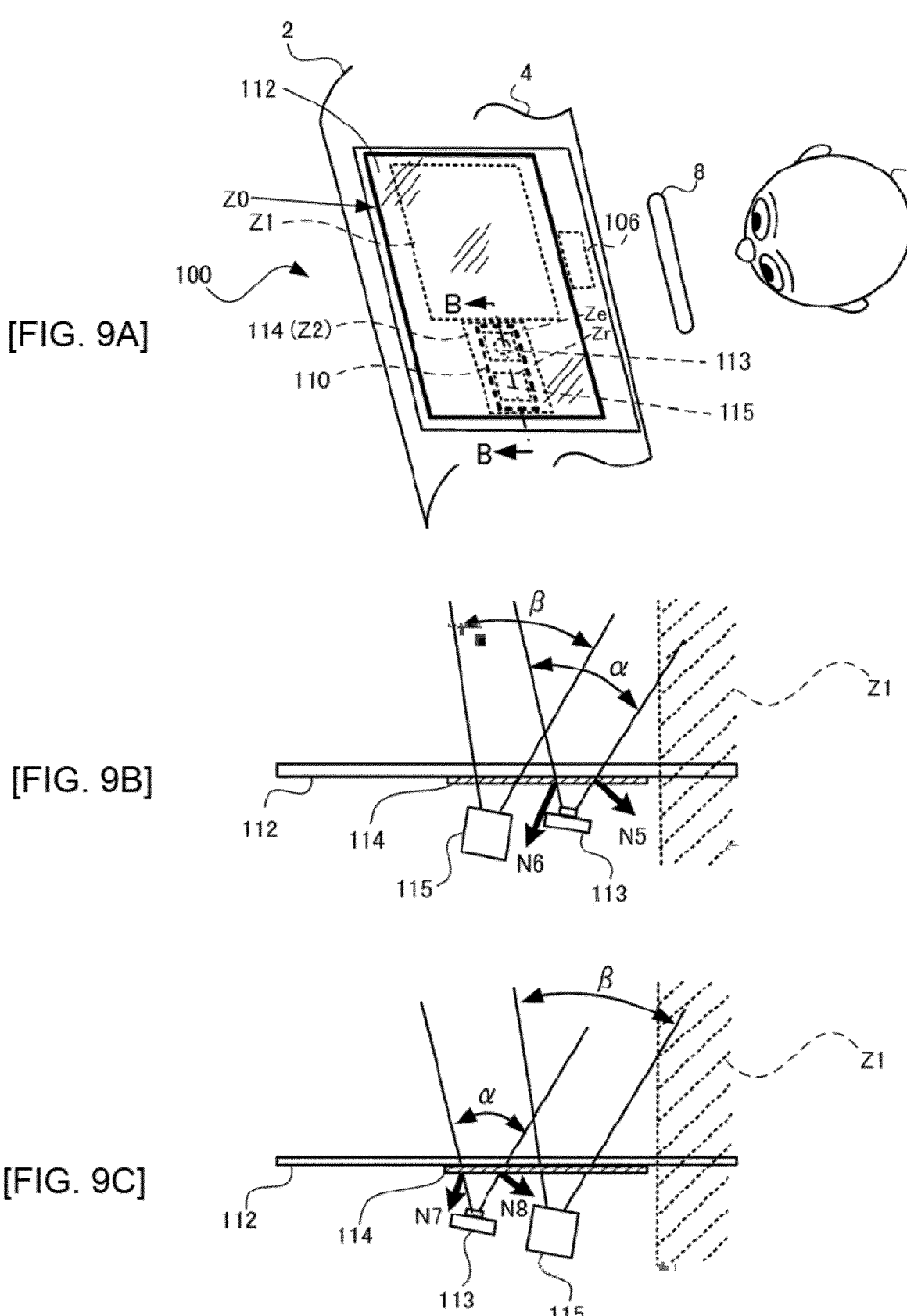
[FIG. 9A]
[FIG. 9B]
[FIG. 9C]

[FIG. 10A]
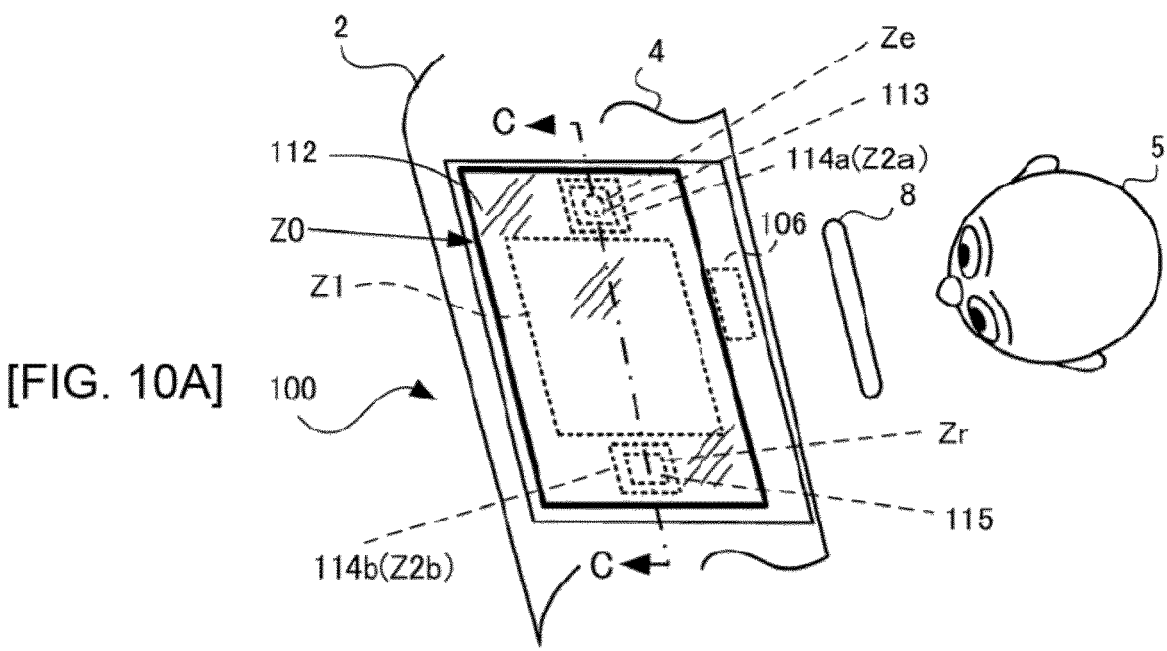
[FIG. 10B]
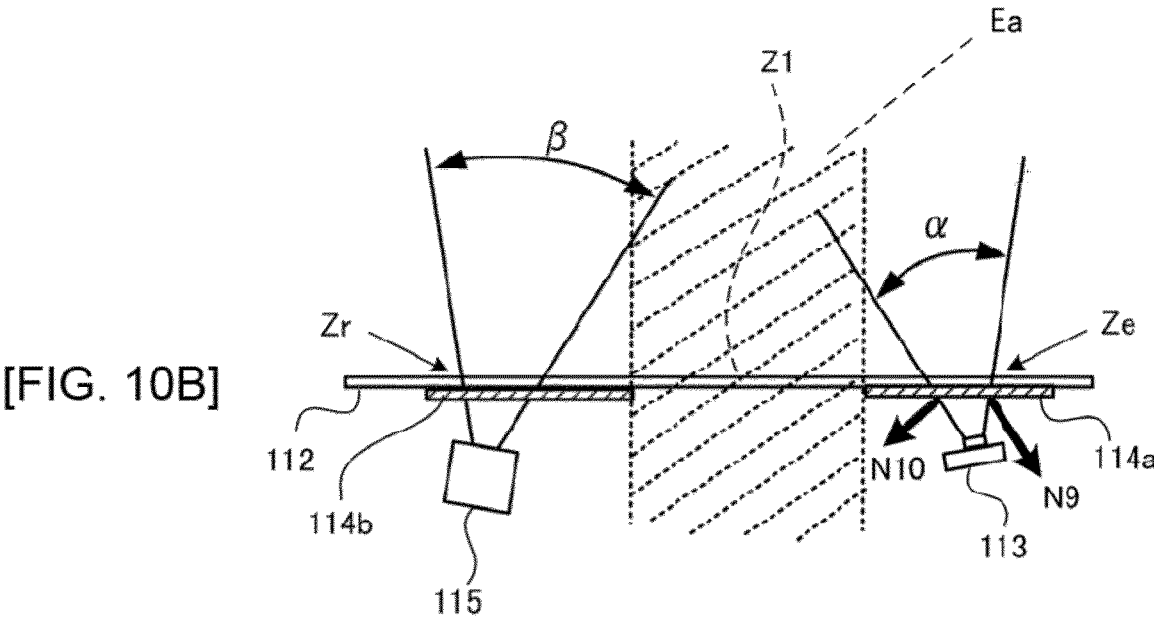

[FIG.11]
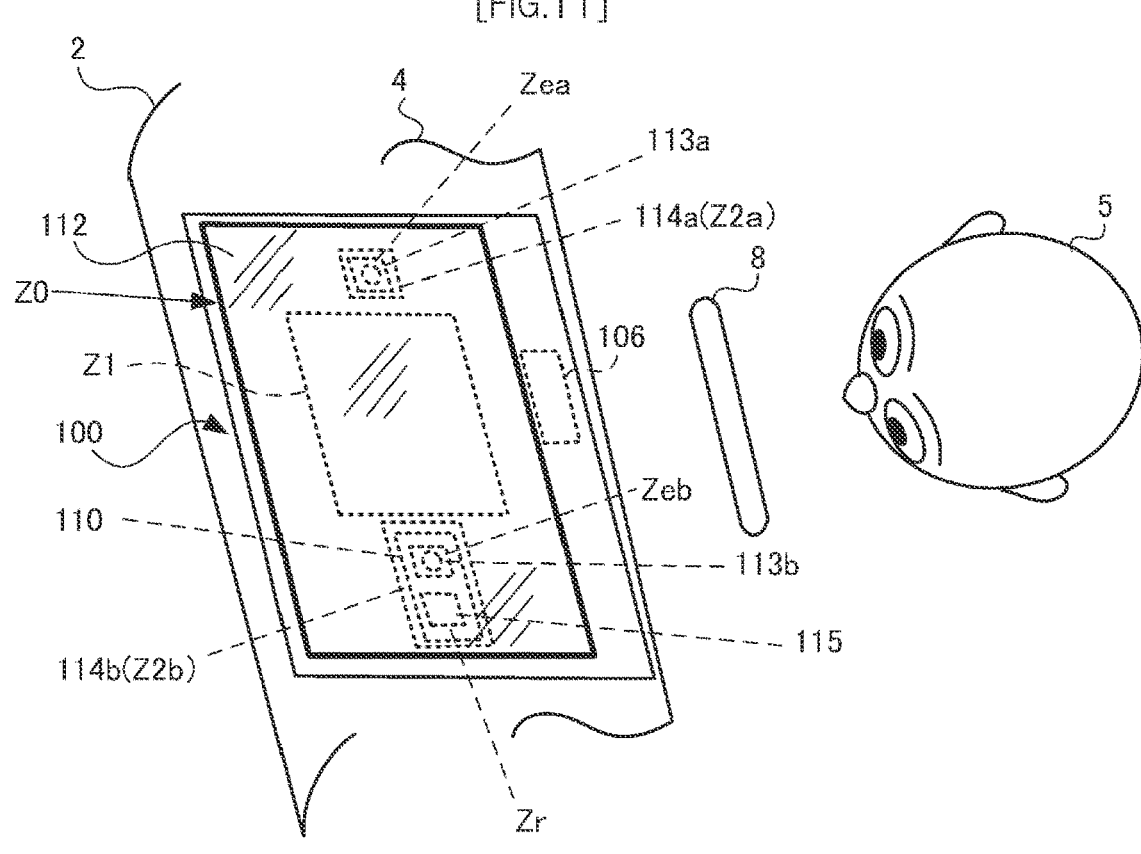
[FIG.12]
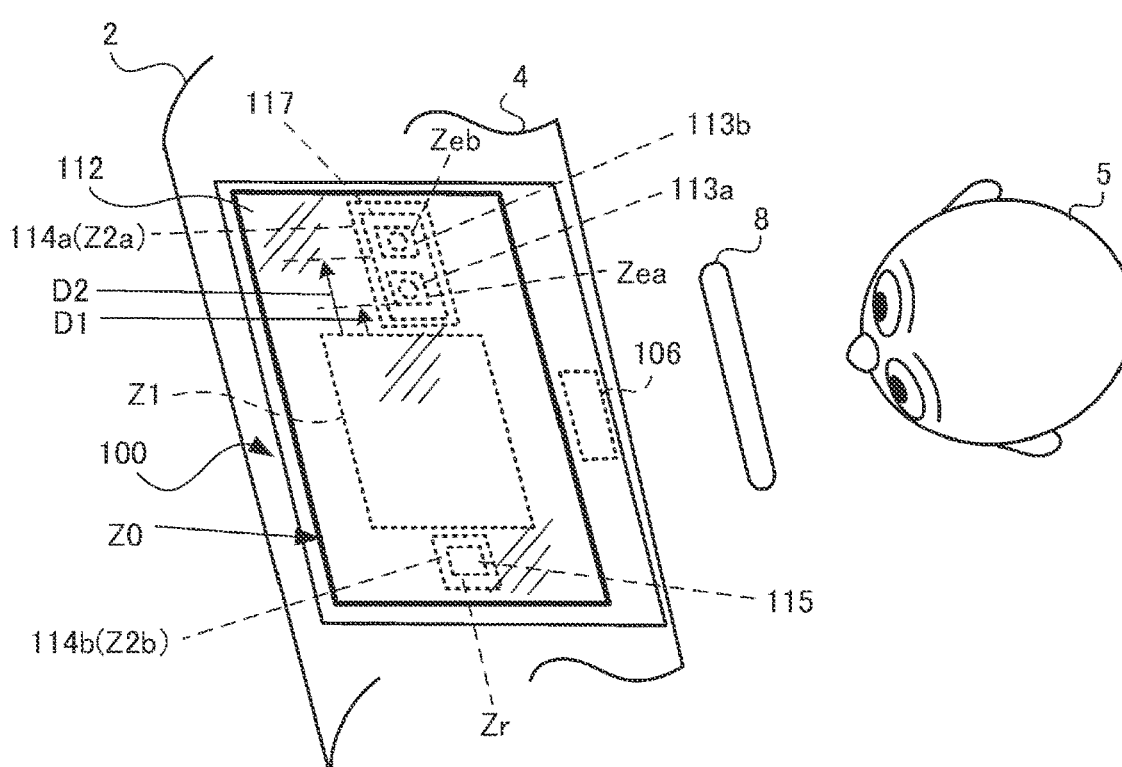

HEAD-UP DISPLAY DEVICE

This application is the U.S. National Phase under 35 U.S.C. § 371 of International Patent Application No. PCT/JP2022/032529, filed on Aug. 30, 2022, which in turn claims the benefit of Japanese Patent Application No. 2021-153000, filed on Sep. 21, 2021, and the entire disclosures of which Applications are incorporated by reference herein.

TECHNICAL FIELD

The present invention relates to a head-up display (HUD) device that is mounted, for example, on a vehicle such as an automobile, and the like.

BACKGROUND ART

Patent Document 1 describes detection of a viewpoint of a driver using an infrared camera and attachment of the infrared camera to a steering column (a shaft portion of a steering wheel) ([0018] and FIG. 4 in Patent Document 1). When the camera is attached to the steering column, rotation of the steering wheel causes rotation of the camera and this leads to distortion of a captured image; thus, Patent Document 1 includes means for electrically correcting the distortion of a captured image.

PRIOR ART DOCUMENT

Patent Document

Patent Document 1: Japanese Unexamined Patent Application Publication No. 2019-26198

SUMMARY OF THE INVENTION

Problems to be Solved by the Invention

The present inventors have studied a configuration in which an infrared camera (or a near-infrared camera) is provided, for example, in a housing of a HUD device. According to this configuration, the camera and a viewpoint detection unit can be installed in the HUD device, and the viewpoint detection unit and a HUD control unit can be connected to each other, for example, by a short wire, and used in the HUD device, thus preventing signal delay and communication noise contamination.

The present inventors have further studied a configuration in which an infrared camera (hereinafter may be simply referred to as a camera) is provided outside a path of display light for displaying an image. According to this configuration, the arrangement of the camera, and the like, can be freely determined independently of an optical system for display light, thus improving the degrees of freedom in design. Furthermore, the configuration eliminates the need to use a single optical element (reflecting mirror, etc.) for both visible light and infrared light, allowing the optical element (optical system) to have a simplified configuration (structure), thus being advantageous in terms of cost.

However, studies by the present inventors have identified the following new problems.

(1) The accuracy in detection of the position of a body part (e.g., eye (viewpoint)) of a person varies depending on the installation position of the camera.

Imaging light (infrared light, etc.) returns to the camera via a windshield (in a broad sense, a reflective translucent member having both light reflecting and light transmitting properties); thus, the angle at which imaging light is reflected by the windshield needs to be studied in advance to determine an appropriate installation position of the camera.

However, the windshield (reflective translucent member) does not have a uniformly curved surface shape, and for example, the curved surface shape of the windshield tends to be gently changed on the center side of the vehicle and sharply changed at the ends (left end and right end) of the vehicle. The degree of distortion of a captured image varies depending on the region on the windshield that is used to reflect imaging light.

Thus, considering the above point, a light emitting element (e.g., an LED that emits infrared radiation) and the camera (e.g., solid-state image sensor such as a CCD) need to be disposed at appropriate positions so that distortion of a captured image can be prevented. Furthermore, it is preferable to appropriately set the direction of imaging light emitted from the light emitting element.

(2) It is preferable to consider not only an effect of reducing distortion of a captured image but also an effect of allowing a reduction in size of the housing of the head-up display (HUD) device.

As described in (1), the camera needs to be disposed so that distortion of a captured image is reduced, and when the camera is located at a position apart from the optical system for display light for displaying an image, the housing needs to have a large size. In this case, the configuration does not meet the demand for a reduction in size of the HUD device. Thus, the arrangement of the light emitting element and the camera is preferably determined also considering the demand for a reduction in size of the HUD device.

(3) Imaging light is emitted toward the windshield (reflective translucent member) via a translucent cover provided at an opening portion of the housing of the HUD device. In other words, via the translucent cover, external light may enter the HUD device from above in the height direction of the vehicle, and via the translucent cover, the person may visually recognize the light emitting element (e.g., LED that emits infrared radiation) and the camera (e.g., solid-state image sensor such as a CCD) located below the translucent cover.

Thus, it is preferable to also consider a measure to prevent external light from entering the HUD device and a measure to prevent the person from feeling unpleasant due to visual recognition of components (in other words, a reduction in marketability of the HUD device).

(4) In some cases, part of the imaging light emitted from the light emitting element (LED, etc.) may be reflected by the translucent cover, and reflected light (stray light) of the imaging light may be incident on the camera (solid-state image sensor, etc.), causing an imaging error. Thus, it is preferable to also consider a measure against such stray light.

The above new problems have been identified by the present inventors. Patent Document 1 describes neither these problems nor measures to address the problems.

An object of the present invention is to achieve, in a head-up display device having a function of displaying an image (virtual image) and a function of capturing an image of a body part (eye, etc.) of an occupant, a reduction in distortion of a captured image and an improvement in accuracy in detection of the body part.

Other objects of the present invention will be apparent to those skilled in the art by referring to the following exemplified aspects and best mode and the accompanying drawings.

Solution to Problem

Aspects according to the present invention will be exemplified to facilitate understanding of the summary of the present invention.

In a first aspect, a head-up display device is a head-up display device that displays a virtual image to an occupant of a vehicle by irradiating, with display light for an image, a reflective translucent member provided in the vehicle and having both light reflecting and light transmitting properties, captures an image of a body part of the occupant by irradiating the body part with imaging light and receiving reflected light from the body part via the reflective translucent member, and is disposed between the occupant and the reflective translucent member in plan view from above in a height direction of the vehicle, the head-up display device including: a housing; a translucent cover that is provided on the housing; a display unit that is provided in the housing and displays the image; an optical system that is provided in the housing and includes an optical element that irradiates the reflective translucent member with the display light via the translucent cover; and an imaging unit that is provided outside a path of the display light for an image in the housing and includes a light emitting element that emits the imaging light and an imaging element that receives the reflected light coming via the reflective translucent member, wherein in plan view from above in the height direction of the vehicle, the housing is disposed between a position at which the occupant is seated and the reflective translucent member, a region of the translucent cover provided on the housing includes a display light passing region in which the display light is allowed to pass through, and an imaging element region that corresponds to the imaging element located below the translucent cover, and the imaging element region is provided on an end side of the vehicle opposite to a center side of the vehicle in a width direction of the vehicle with respect to the display light passing region as viewed from the occupant.

In the first aspect, the HUD device may be disposed, for example, at a position in front of the occupant (imaging target) and behind a windshield (in the vicinity of the windshield, etc.). From the HUD device, display light for displaying an image and imaging light for capturing an image of a body part of the occupant are emitted.

Imaging light is emitted from the light emitting element, and the occupant is irradiated with the imaging light via the windshield (reflective translucent member). Reflected light of the imaging light is incident on and reflected by the windshield, and is received by a camera (imaging element) disposed at a predetermined position, and an image is captured.

In order to capture an image of a body part (e.g., face, eye, etc.) of the person as accurately as possible, it is advantageous to capture an image from the front. For example, it is a common experience that a quadrangle as viewed from the front appears as a quadrangle; however, a quadrangle as viewed from an oblique angle appears as a parallelogram or a trapezoid due to image distortion.

The occupant (e.g., driver) is located on the left end side of a left-hand drive vehicle in the width direction of the vehicle, and is located on the right end side of a right-hand drive vehicle in the width direction of the vehicle. Furthermore, in general, the curved surface shape of the windshield is sharply changed (in other words, the shape has a large curvature and a small curvature radius) on the end side of the vehicle, and the curved surface shape of the windshield is gently changed (in other words, the shape has a small curvature and a large curvature radius) on the center side of the vehicle.

When light is reflected at a position on the windshield on the end side of the vehicle at which the curved surface shape is sharply changed, the light can be reflected at a more acute angle with respect to the width direction of the vehicle. The configuration that enables light to be reflected at an acute angle can be easily used for irradiation with display light while the display light is close to the front of the occupant (driver), and easily used to allow reflected light of the imaging light on the occupant (driver) to be reflected at a position closer to the front and returned to the camera (imaging element) located at a position close to the light emitting element. Capturing an image at a position close to the front leads to a reduction in distortion of a captured image.

In other words, the imaging element is disposed at a position at which the optical axis of the imaging element is less distorted with respect to the reflective translucent member, thus reducing distortion of a captured image and improving accuracy in detection of the position of an eye of the user.

The reflection of light at an acute angle can be used to allow the returning optical path of the reflected light of the imaging light to have a short optical path length. This is useful, for example, to prevent an increase in distortion caused by reflection of imaging light on the windshield. This also makes it possible to reduce distortion of a captured image.

Furthermore, the reflected light can be received at a position closer to the front in the width direction of the vehicle (in other words, the imaging element can be disposed closer to the front position). As the distance from the front position to the arrangement position of the imaging element is increased, the housing has a larger size in the lateral direction (the width direction of the vehicle), requiring the HUD device to have a larger size. Thus, the configuration efficiently using reflection of light at an acute angle can be expected to have an effect of preventing an increase in size of the housing.

From this viewpoint, the first aspect adopts a layout configuration in which the region (imaging element region) including the imaging element is provided closer to the end side of the vehicle (the side of the vehicle opposite to the center side) in the width direction of the vehicle than the display light passing region in which (a wider pencil of) display light is allowed to pass through and in which the position on the windshield (reflective translucent member) on the end side at which the curved surface shape is greatly changed can be easily used.

This makes it possible to prevent (reduce) distortion of a captured image, maintaining a high accuracy in detection of the position of a body part (e.g., face, eye, etc.) of the person. Furthermore, this achieves a reduction in size of the housing of the HUD device.

In a second aspect that can be dependent on the first aspect, the head-up display device may be configured such that the display light is visible light, and the imaging light is infrared light, the head-up display device includes a filter unit that is provided below the translucent cover and that transmits infrared light and blocks visible light, in plan view from above in the height direction of the vehicle, the region of the translucent cover includes a filter unit region that corresponds to the filter unit, and the filter unit region includes the imaging element region.

In the second aspect, the filter unit that transmits infrared light and blocks visible light is provided below the translucent cover. The filter unit may be, for example, a multilayer long-path filter composed of a material that absorbs visible light and transmits infrared light (specifically, an IR filter attached to a rear surface of the translucent cover, etc.).

The imaging element is disposed at a position corresponding to the filter unit. In other words, a layout configuration is adopted in which the filter unit region corresponding to the filter unit includes the imaging element region in plan view of the translucent cover from above.

In other words, in the cross-sectional structure of the housing, the filter unit is present above the imaging element. Therefore, external light incident on the translucent cover from above is blocked by the filter unit. This makes it possible to prevent a reduction in imaging accuracy due to external light.

Similarly, the line of sight of the person from above is blocked by the filter unit. This makes it possible to prevent the person from feeling unpleasant due to visual recognition of components (in other words, a reduction in marketability of the HUD device).

In a third aspect that can be dependent on the first or second aspect, an intersection of an optical axis of the imaging element and the reflective translucent member is located above a reflection point on the reflective translucent member at which a principal ray of the display light is reflected.

In the third aspect, in order to allow an image of a body part such as an eye of the occupant (driver, etc.) to be captured from a position as close as possible to the front, the position at which a principal ray of the imaging light (including both irradiation light emitted from the light emitting element toward the windshield and reflected light from the body part of the person) is reflected by the windshield (reflective translucent member) is set to be above the position at which a principal ray of the display light for an image is reflected.

The "principal ray of the imaging light" is, in other words, a principal ray that travels along the optical axis of the imaging element (this is referred to as a principal ray). Thus, "the reflection position on the windshield at which the principal ray of the imaging light is reflected" can be rephrased as "the position of the intersection of the optical axis of the imaging element and the windshield."

For example, the face (particularly, eye) of the person is located above an instrument panel and a steering wheel. Thus, in accordance with the height of the face, eye, or the like, the position of the intersection of the optical axis of the imaging light and the windshield is set to be a position higher than the position of the reflection region in which the display light for an image is reflected, in order to allow an image of a body part (e.g., face, eye, etc.) of the person to be captured at an angle closer to the front. This makes it possible to prevent distortion of a captured image, maintaining a high accuracy in detection of the position of a face or an eye.

Furthermore, the above configuration reliably avoids a situation where imaging light is blocked by the instrument panel or the steering wheel and an image of a body part of the person cannot be captured. This makes it possible to prevent a reduction in reliability of the image capturing function of the HUD device.

In a fourth aspect that can be dependent on any one of the first to third aspects, the head-up display device may be configured such that in plan view from above in the height direction of the vehicle, the region of the translucent cover provided on the housing includes a light emitting element region that corresponds to the light emitting element located below the translucent cover, and the light emitting element region is provided on the end side of the vehicle opposite to the center side of the vehicle in the width direction of the vehicle with respect to the display light passing region as viewed from the occupant.

The fourth aspect describes a preferred example of a layout configuration of the light emitting element region. In the fourth aspect, the light emitting element region is provided on the end side of the vehicle (the side of the vehicle opposite to the center side) with respect to the display light passing region.

In other words, "the light emitting element region" is disposed on the same side as "the imaging element region" described in the first aspect (on the end side of the vehicle with respect to the display light passing region). This layout configuration has, for example, an effect of allowing the light emitting element and the imaging element disposed close to each other to be handled as a single image capturing unit. Specifically, the light emitting element and the imaging element housed as a single unit in a single package are easier to handle than the elements individually handled.

When the light emitting element and the imaging element are individually installed, the relative positions of the elements may vary. The elements installed as a single unit have an advantage in that a deviation in the relative positions of the elements is determined by the accuracy of the layout of the elements in a manufacturing process of the single unit, and does not depend on a positional deviation during mounting of the elements.

In a fifth aspect that can be dependent on any one of the first to third aspects, the head-up display device may be configured such that in plan view from above in the height direction of the vehicle, the region of the translucent cover provided on the housing includes a light emitting element region that corresponds to the light emitting element located below the translucent cover, and the light emitting element region is provided on the center side of the vehicle in the width direction of the vehicle with respect to the display light passing region as viewed from the occupant.

The fifth aspect describes another preferred example of the layout configuration of the light emitting element region. In the fifth aspect, the light emitting element region is provided on the center side of the vehicle with respect to the display light passing region.

In other words, "the light emitting element region" is disposed on the side opposite to "the imaging element region" (on the center side of the vehicle) with respect to the display light passing region. The display light passing region is present between the light emitting element region and the imaging element region; thus, a large space is provided between the light emitting element region and the imaging element region accordingly.

When imaging light emitted from the light emitting element is reflected by the translucent cover (or the filter unit) provided on the housing, stray light is generated, and if the stray light is incident on the imaging element, the stray light causes an imaging error.

In the present aspect, the light emitting element and the imaging element are disposed apart from each other, sufficiently preventing stray light from being incident on the imaging element. Thus, the layout configuration of the present aspect is useful as a measure against stray light.

In some cases, the light emitting element and the imaging element disposed apart from each other may lead to a larger amount of imaging light reflected by a body part of the person and returned to the imaging element as compared with the case where the elements are disposed on the same side. The layout configuration of the present aspect is also useful to achieve a more flexible layout of the elements according to the situation.

In a sixth aspect that can be dependent on any one of the first to third aspects, the head-up display device may be configured such that in plan view from above in the height direction of the vehicle, the region of the translucent cover provided on the housing includes a light emitting element region that corresponds to the light emitting element located below the translucent cover, the head-up display device includes first and second light emitting elements as the light emitting element, the light emitting element region includes a first light emitting element region that corresponds to the first light emitting element, and a second light emitting element region, the first light emitting element region is provided on the center side of the vehicle in the width direction of the vehicle with respect to the display light passing region as viewed from the occupant, and the second light emitting element region is provided on the end side of the vehicle opposite to the center side of the vehicle in the width direction of the vehicle with respect to the display light passing region as viewed from the occupant.

The sixth aspect uses the first and second light emitting element. The first light emitting element is provided on the center side of the vehicle with respect to the display light passing region. The second light emitting element is provided on the end side of the vehicle with respect to the display light passing region.

In other words, the display light passing region is present between the first and second light emitting elements; thus, the elements are installed at considerably different positions with a large space therebetween. Therefore, for example, it is possible to allow an optical path (first optical path) in which imaging light emitted from the first light emitting element is reflected by the windshield and a body part of the person is irradiated with the light to be different from an optical path (second optical path) in which imaging light emitted from the second light emitting element is reflected by the windshield and a body part of the person is irradiated with the light.

Considering this point, switching the light emitting element to be used between the two light emitting elements (imaging light sources) or using the two light emitting elements (imaging light sources) in combination may reduce the adverse effect of stray light that is likely to be generated, for example, when the person (driver) wears sunglasses.

In some cases, for example, reflection (diffuse reflection, etc.) of imaging light different from normal may occur on the surface of sunglasses that the driver wears, and reflected light different from normal of the imaging light may be reflected by the windshield and returned to the imaging element. In such a case, the light does not pass through a normal optical path, and this may cause an increase in distortion of an image.

In this case, as described above, by switching the light emitting element to be used between the two light emitting elements (imaging light sources) or by using the two light emitting elements (imaging light sources) in combination, it is possible to slightly change the optical path (in other words, the incident angle) of imaging light with which a body part of the person is irradiated or to change the cross-sectional shape of a pencil of light with which a body part of the person is irradiated or increase the area of the cross-sectional shape. This may reduce the stray light.

For example, the incident angle of returning stray light on the imaging element may be changed, and the stray light is less likely to be sensed. Furthermore, normal (regular) returning light may be increased, achieving a better S/N.

Thus, the configuration of the present aspect may be used as a measure against stray light, for example, when the person (driver) wears sunglasses or the like.

The configuration of the present aspect is also useful to increase the amount of imaging light returning to the imaging element to improve detection sensitivity.

In a seventh aspect that can be dependent on any one of the first to third aspects, the head-up display device may be configured such that in plan view from above in the height direction of the vehicle, the region of the translucent cover provided on the housing includes a light emitting element region that corresponds to the light emitting element located below the translucent cover, the head-up display device includes first and second light emitting elements as the light emitting element, the light emitting element region includes a first light emitting element region that corresponds to the first light emitting element, and a second light emitting element region, the first light emitting element region is provided on the center side of the vehicle in the width direction of the vehicle with respect to the display light passing region as viewed from the occupant, and the second light emitting element region is provided at a position that is located on the center side of the vehicle in the width direction of the vehicle with respect to the display light passing region as viewed from the occupant and that is located farther from the display light passing region than the first light emitting element region in the width direction of the vehicle.

As in the sixth aspect, the configuration of the seventh aspect includes the first and second light emitting elements (imaging light source), and by switching the light emitting element to be used between the two light emitting elements or by using the two light emitting elements in combination, the configuration is used as a measure against stray light or used to increase the amount of imaging light returning to the imaging element.

In the seventh aspect, the first and second light emitting elements are provided on the sides opposite to each other with respect to the display light passing region; however, in the present aspect, the first and second light emitting elements are both provided on the center side (on the same side). Furthermore, the second light emitting element is provided at a position farther from the display light passing region than the first light emitting element. The space between the first and second light emitting elements, and the like, can be finely adjusted as appropriate.

Those skilled in the art will readily understand that the exemplified aspects according to the present invention may be modified without departing from the spirit of the present invention.

BRIEF DESCRIPTION OF THE DRAWINGS

FIG. 1A is a diagram illustrating an example of a configuration of a HUD device, and FIG. 1B is a diagram illustrating that a translucent cover region can be divided into a first region (display light passing region) in which display light as visible light is allowed to pass through and a second region (filter unit region) in which infrared light is transmitted and visible light is not transmitted.

FIG. 2A is a diagram illustrating an example of a layout of an image capturing unit including a light emitting element and an imaging element, and FIG. 2B is a diagram illustrating another example of the layout of the image capturing unit.

FIG. 3A is a diagram illustrating an arrangement example of the HUD device in a left-hand drive vehicle, examples of optical paths of visible light (display light) and infrared light (imaging light), and the like, and FIG. 3B is a diagram illustrating an arrangement example of an imaging unit (image capturing unit) in the HUD device.

FIG. 4A is a diagram illustrating an arrangement example of the HUD device in a right-hand drive vehicle, examples of optical paths of visible light (display light) and infrared light (imaging light), and the like, and FIG. 4B is a diagram illustrating an arrangement example of the imaging unit (image capturing unit) in the HUD device.

FIG. 5 is a diagram illustrating an advantage of disposing the imaging element (imaging element region) on the end side of the vehicle with respect to the display light passing region.

FIG. 6 is a diagram illustrating a preferred example of optical paths (paths) of display light and imaging light.

FIGS. 7A and 7B are diagrams illustrating an effect of blocking external light and line of sight by a filter unit.

FIGS. 8A to 8C are diagrams illustrating an example of a preferred arrangement of the light emitting element (light emitting element region) and the imaging element (imaging element region), considering stray light generated on the translucent cover (or the filter unit provided below the translucent cover).

FIGS. 9A to 9C are diagrams illustrating another example of the preferred arrangement of the light emitting element (light emitting element region) and the imaging element (imaging element region), considering stray light generated on the translucent cover (or the filter unit provided below the translucent cover).

FIG. 10A is a diagram illustrating an example in which the light emitting element (light emitting element region) is disposed on the right side of the display light passing region as viewed from a driver and the imaging element (imaging element region) is disposed on the left side of the display light passing region as viewed from the driver, and FIG. 10B is a diagram illustrating an effect of preventing stray light.

FIG. 11 is a diagram illustrating an example of a layout configuration using first and second light emitting elements.

FIG. 12 is a diagram illustrating another example of the layout configuration using the first and second light emitting elements.

MODE FOR CARRYING OUT THE INVENTION

The following best mode is used to facilitate understanding of the present invention. Therefore, those skilled in the art should note that the present invention is not unreasonably limited by the following embodiments.

First Embodiment

FIG. 1A is a diagram illustrating an example of a configuration of a HUD device, and FIG. 1B is a diagram illustrating that a translucent cover region can be divided into a first region (display light passing region) in which display light as visible light is allowed to pass through and a second region in which infrared light is transmitted and visible light is not transmitted (filter unit region in which infrared light is transmitted).

As illustrated in FIG. 1A, a head-up display (HUD) device 100 has a function of displaying a virtual image V on a virtual image display surface PS to an occupant (a driver in this case) 5 of a vehicle 1 by irradiating, with display light L1 for an image, a windshield 2 as a reflective translucent member that is mounted on the vehicle 1 and has both light reflecting and light transmitting properties.

The HUD device 100 also has a function of capturing an image of a body part (face, eye, etc.; in this case, an eye (viewpoint) 7) of the occupant (driver) 5 by irradiating the body part with imaging light L2 via the windshield 2 and receiving reflected light L3 from the body part via the windshield 2.

The position of the eye (viewpoint) is detected based on the captured image. The detected position of the viewpoint may be used to perform, for example, viewpoint position tracking lighting, viewpoint position tracking warping, or the like.

For example, as illustrated in FIG. 3A and FIG. 4A, in plan view from above in the height direction of the vehicle 1 (Y direction), the HUD device 100 is disposed at a front (and lower) position, as viewed from the driver 5, between the occupant (driver) 5 (or a steering wheel 8) and the windshield 2 as a reflective translucent member.

Specifically, the HUD device 100 is housed in an instrument panel 4 in the vicinity of the windshield 2.

As illustrated in FIG. 1A, the HUD device 100 includes a housing 116, a translucent cover 112 that is provided on the housing, a display unit 102 (including a display panel 104 such as a liquid crystal display device) that is provided in the housing and displays an image, an optical system (including a plane mirror 106) that is provided in the housing and includes an optical element (a curved mirror 108 such as a concave mirror) that irradiates the windshield 2 as a reflective translucent member with display light L1 via the translucent cover 112, an imaging unit (may be referred to as an image capturing unit) 110 that is provided outside a path of display light L1 for an image in the housing 1 and includes a light emitting element (not illustrated in FIG. 1; reference numeral 113 in FIG. 2, etc.) that emits imaging light L2 and an imaging element (not illustrated in FIG. 1; reference numeral 115 in FIG. 2, etc.) that receives reflected light L3 of the imaging light coming via the windshield 2. In the example in FIG. 1A, the light emitting element 113 emits imaging light toward the windshield 2 via the translucent cover 112. However, this is not a limitation, and the light emitting element 113 may be configured to directly irradiate the occupant (driver, etc.) with imaging light without using the windshield 2.

The display light L1 is visible light, and the imaging light L2 (and the reflected light L3 of the imaging light reflected by a body part of the person and returned to the imaging unit 110) is infrared light (or near-infrared light). However, this is an example, and light in other wavelength ranges may be used.

Furthermore, the HUD device 100 includes a filter unit 114 that is provided below the translucent cover 112 and that transmits infrared light and blocks visible light.

The filter unit 114 has a function of preventing external light from being incident on the imaging unit 110 and preventing the person from visually recognizing the imaging unit 110 via the translucent cover 112.

The filter unit 114 may be, for example, a multilayer long-path filter composed of a material that absorbs visible light and transmits infrared light (specifically, an IR filter attached to a rear surface of the translucent cover 112, etc.).

As illustrated in FIG. 1B, the region of the translucent cover 112 can be divided into a display light passing region (may be referred to as a first region) Z1 in which display light (visible light) is allowed to pass through and a filter unit region (region corresponding to the filter unit 114; may be referred to as a second region) Z2 in which infrared light is transmitted and visible light is blocked.

The first region Z1 may also be referred to as a "display light (visible light) transmission region". The second region Z2 may also be referred to as an "infrared light transmission region".

For convenience, FIG. 1B illustrates the regions Z1 and Z2 disposed along the front-rear direction of the vehicle 1; however, the regions Z1 and Z2 are actually disposed along the width direction of the vehicle 1 (lateral direction) (this point will be described below).

Next, reference is made to FIG. 2. FIG. 2A is a diagram illustrating an example of a layout of the image capturing unit including the light emitting element and the imaging element, and FIG. 2B is a diagram illustrating another example of the layout of the image capturing unit. In FIG. 2, portions common to those in FIG. 1 are denoted by the same reference numerals (the same applies to the other figures).

FIGS. 2A and 2B illustrate an arrangement example in a left-hand drive vehicle (see FIG. 3A).

As illustrated in FIGS. 2A and 2B, the HUD device 100 is disposed at the front (and lower) position, as viewed from the driver 5, between the occupant (driver) 5 (or the steering wheel 8) and the windshield 2 as a reflective translucent member.

In FIGS. 2A and 2B, the translucent cover 112 provided on the housing 116 is exposed on the side closer to the windshield 2. Via the translucent cover 112, display light L1 and imaging light L2 are emitted, and reflected light L3 of the imaging light L2 reflected by a body part of the person is returned, and the reflected light L3 is received by the imaging element (solid-state image sensor such as a CCD; camera in a broad sense) 115.

A region (translucent cover region Z0) in which the translucent cover 112 is present is a rectangular region in plan view from above in the height direction of the vehicle 1 (Y direction), and is indicated by a thick solid line in FIGS. 2A and 2B.

The translucent cover region Z0 includes the display light passing region (or display light transmission region) Z1 in which (a pencil of) display light L1 is allowed to pass through, a light emitting element region (light source region in a broad sense) Ze that corresponds to the light emitting element (infrared light emitting diode, etc.; light source in a broad sense) located below the translucent cover 112, and an imaging element region (camera region in a broad sense) Zr that corresponds to the imaging element (CCD, etc.; camera in a broad sense) 115 also located below the translucent cover 112.

The light emitting element 113 and the imaging element 115 are components of the image capturing unit (imaging unit) 110. The image capturing unit (imaging unit) 110 is disposed below the filter unit 114. A layout configuration is adopted in which an image capturing unit region (imaging unit region) is disposed in the filter unit region Z2 corresponding to the filter unit 114 in plan view from above.

Reference numeral 106 represents the plane mirror as a component of the optical system of the HUD device 100.

In FIGS. 2A and 2B, the imaging element region Zr is disposed on the end side of the vehicle opposite to the center side of the vehicle in the width direction of the vehicle 1 as viewed from the occupant (driver) 5 (in other words, on the left side as viewed from the driver 5) with respect to the display light passing region Z1.

This arrangement is advantageous in reducing distortion of a captured image and reducing the size of the housing (this point will be described below).

In FIG. 2A, the light emitting element 113 and the imaging element 115 are disposed along the front-rear direction of the vehicle. In other words, the light emitting element 113 is disposed on the rear side, and the imaging element 115 is disposed on the front side. This arrangement has an advantage in that the adverse effect of stray light generated by reflection of infrared light on the translucent cover 112 can be reduced (this point will be described below).

In FIG. 2B, the light emitting element 113 and the imaging element 115 are disposed along the width direction of the vehicle (lateral direction). In other words, the light emitting element 113 is disposed on the right side as viewed from the driver 5, and the imaging element 115 is disposed on the left side as viewed from the driver 5. This arrangement has an advantage in that the adverse effect of stray light generated by reflection of infrared light on the translucent cover 112 can be reduced (this point will be described below).

Considering the occurrence of stray light and the like, either of the arrangements in FIGS. 2A and 2B can be selected to reduce more stray light.

Next, reference is made to FIG. 3. FIG. 3A is a diagram illustrating an arrangement example of the HUD device in a left-hand drive vehicle, examples of optical paths of visible light (display light) and infrared light (imaging light), and the like, and FIG. 3B is a diagram illustrating an arrangement example of the imaging unit (image capturing unit) in the HUD device.

In FIG. 3, the arrangement illustrated in FIG. 2A is adopted. As illustrated in FIG. 3A, the vehicle 1 is a left-hand drive vehicle, and the driver 5 is located on the left end (second end) side of the vehicle 1. Reference numeral 91 represents a right side mirror, and reference numeral 93 represents a left side mirror.

In FIG. 3A, on the windshield 2, a position P1 surrounded by a dashed circle represents a reflection position at which display light (visible light) L1 for displaying an image is reflected in the width direction of the vehicle. A position P2 represents a reflection position at which emitted imaging light (infrared light) L2 and reflected light L3 reflected by a body part of the person (or returning light returning toward the imaging element 115) are reflected in the width direction of the vehicle.

The position P1 is located on the center side (closer to the center) in the width direction of the vehicle, and the position P2 is located on the end side (closer to the end) in the width direction of the vehicle.

At the position P1, the change of the curved surface shape (degree of the curve) of the windshield 2 is gentle, and at the position P2, the change of the curved surface shape of the windshield 2 is considerably sharp. Effective use of the sharp curved surface shape allows an image of the driver 5 to be captured from a position as close as possible to the front by reflecting imaging light (infrared light) L2 and L3 at an acute angle, and provides an effect of preventing an increase in size of the housing (details of this point will be described below).

As illustrated in FIG. 3B, the image capturing unit (imaging unit) 110 includes the light emitting element 113 and the imaging element 115. In FIG. 3B, the filter unit region Z2 is omitted.

In FIG. 3B, in plan view from above in the height direction of the vehicle 1, the light emitting element region Ze corresponds to the light emitting element 113, and the imaging element region Zr corresponds to the imaging element 115.

The imaging element region Zr is located on the left side as viewed from the driver 5, in other words, on the end side in the width direction of the vehicle 1 (lateral direction), with respect to the display light passing region Z1.

Next, reference is made to FIG. 4. FIG. 4A is a diagram illustrating an arrangement example of the HUD device in a right-hand drive vehicle, examples of optical paths of visible light (display light) and infrared light (imaging light), and the like, and FIG. 4B is a diagram illustrating an arrangement example of the imaging unit (image capturing unit) in the HUD device. In FIG. 4, portions common to those in FIG. 3 are denoted by the same reference numerals.

As illustrated in FIG. 4A, the vehicle 1 is a right-hand drive vehicle, and the driver 5 is located on the right end (first end) side of the vehicle 1. Accordingly, the HUD device is also provided on the right end side in the width direction of the vehicle 1.

The matters described with reference to FIGS. 3A and 3B are also applicable to FIGS. 4A and 4B.

Next, reference is made to FIG. 5. FIG. 5 is a diagram illustrating an advantage of disposing the imaging element (imaging element region) on the end side of the vehicle with respect to the display light passing region. The vehicle in FIG. 5 is assumed to be the left-hand drive vehicle illustrated in FIG. 3.

In practice, imaging light (infrared light) travels along a complicated path; however, FIG. 5 illustrates a simplified travel path in plan view from above in the height direction of the vehicle (Y direction). Here, in particular, the focus is on the incident angle and reflection angle of imaging light (infrared light) in the width direction of the vehicle (X direction) with respect to the windshield 2.

Imaging light (infrared light) L2 is emitted from the light emitting element 113, and the driver 5 is irradiated with the imaging light (infrared light) L2 via the windshield (reflective translucent member) 2 (see FIG. 3A). Reflected light L3 of the imaging light (infrared light) L2 is incident on and reflected by the windshield 2, and is received by the camera (imaging element) 115 disposed at a predetermined position, and an image is captured.

In order to capture an image of a body part (e.g., face, eye, etc.) of the person as accurately as possible, it is advantageous to capture an image from the front. For example, it is a common experience that a quadrangle as viewed from the front appears as a quadrangle; however, a quadrangle as viewed from an oblique angle appears as a parallelogram or a trapezoid due to image distortion. Thus, an image is preferably captured from a position as close as possible to the front.

In FIG. 5, a dashed straight line G1 represents the sagittal plane of the driver 5, and the direction along the sagittal plane G1 can be considered as a front direction, and the position of an intersection of the sagittal plane G1 and the windshield 2 can be considered as a front position.

A preferred arrangement of the imaging element (camera) 115 will be described below. The imaging unit (image capturing unit) 110 including the light emitting element 113 and the imaging element 115 is disposed in the vicinity of the display light passing region Z1 so as not to overlap with the display light passing region Z1 to allow display light L2 (L3) to travel.

As can be seen from FIG. 5, the imaging element can be disposed at either of a position on the left side of the display light passing region Z1 and a position on the right side of the display light passing region Z1. In FIG. 5, the imaging element disposed on the left side is denoted by reference numeral 115 and the imaging element disposed on the right side is denoted by reference numeral 115' to make the imaging elements distinguishable from each other. Furthermore, the prime symbol ' is used to distinguish a light beam and the like related to the imaging element 115' from those related to the imaging element 115.

FIG. 5 illustrates two reflected light principal rays L3 and L3' reflected by an eye of the driver 5 (considered to be located at the center of the face of the driver).

The reflected light L3 is reflected obliquely leftward and forward at an angle θ1 as viewed from the driver 5, and the reflected light L3' is reflected obliquely rightward and forward also at an angle θ1 as viewed from the driver 5. The reflection angles of the reflected light L3 and L3' are both θ1.

However, the two reflected light principal rays L3 and L3' are incident on the windshield 2 at different angles. The incident angle (and reflection angle) of the principal ray L3 is θ2, and the incident angle (and reflection angle) of the principal ray L3' is θ3, and θ2<θ3.

The driver 5 is located on the left end side of the left-hand drive vehicle in the width direction of the vehicle 1. Furthermore, as is clear from FIG. 5, the curved surface shape of the windshield 2 is sharply changed (in other words, when the windshield 2 has a partial arc shape, the partial arc shape has a large curvature and a small curvature radius) on the end side of the vehicle 1, and the curved surface shape of the windshield 2 is gently changed (in other words, the partial arc shape has a small curvature and a large curvature radius) on the center side of the vehicle 1.

When light is reflected at the position (position P2 in FIG. 5) on the windshield on the end side of the vehicle 1 at which the curved surface shape is sharply changed, the light can be reflected at a more acute angle (at an angle θ2) with respect to the width direction of the vehicle. The configuration that enables light to be reflected at an acute angle can be easily used for irradiation with display light L2 while the display light L2 is close to the front of the driver 5, and easily used to allow reflected light L3 of the imaging light on the driver 5 to be reflected at a position closer to the front (at a position closer to the sagittal plane G1) and returned to the imaging element (camera) 115 located close to the light emitting element 113. Capturing an image at a position close to the front leads to a reduction in distortion of a captured image.

In other words, the imaging element 115 is disposed at a position at which the optical axis of the imaging element is less distorted with respect to the windshield (reflective translucent member) 2, thus reducing distortion of a captured image and improving accuracy in detection of the position of an eye of the user.

The reflection of light at an acute angle can be used to allow the returning optical path of the reflected light (principal ray L3 in FIG. 5) of the imaging light to have a short optical path length. This is useful, for example, to prevent an increase in distortion caused by reflection of imaging light on the windshield 2. This also makes it possible to reduce distortion of a captured image.

Furthermore, the reflected light can be received at a position closer to the front in the width direction of the vehicle (in other words, the imaging element can be disposed closer to the front position (the position of the intersection of the sagittal plane G1 and the windshield 2)).

As the distance from the front position to the arrangement position of the imaging element 113 is increased, the housing 116 has a larger size in the lateral direction (the width direction of the vehicle), requiring the HUD device 100 to have a larger size. Thus, the configuration efficiently using reflection of light at an acute angle can be expected to have an effect of preventing an increase in size of the housing.

As is clear from FIG. 5, the imaging element (camera) 115 is disposed at a position close to the display light passing region Z1, contributing to a reduction in size of the housing 116 of the HUD device 100.

On the other hand, the incident angle (and reflection angle) of the reflected light L3' is θ3, which is considerably large. This leads to an image of a body part of the driver 5 substantially captured from a considerably oblique angle at a position apart from the front position, causing an increase in distortion of a captured image.

The reflected light L3' has a longer optical path length than the reflected light L3, and this may lead to a larger error. Furthermore, in order to receive the reflected light L3', the imaging element 115' needs to be disposed at a position apart from the display light passing region Z1. This causes the housing 116 to have a larger size and does not meet the demand for a reduction in size of the HUD device 100.

From this viewpoint, the present embodiment adopts a layout configuration in which the imaging element region Ze (see FIG. 3B) including the imaging element 115 is provided closer to the end side of the vehicle (the side of the vehicle opposite to the center side) in the width direction of the vehicle than the display light passing region Z1 in which (a pencil of) display light L1 is allowed to pass through and in which the position on the windshield (reflective translucent member) 2 on the end side at which the curved surface shape is greatly changed can be easily used.

This makes it possible to prevent (reduce) distortion of a captured image, maintaining a high accuracy in detection of the position of a body part (e.g., face, eye, etc.) of the person. Furthermore, this achieves a reduction in size of the housing of the HUD device.

Next, reference is made to FIG. 6. FIG. 6 is a diagram illustrating a preferred example of optical paths (paths) of display light and imaging light. In FIG. 6, portions common to those in the figures shown above are denoted by the same reference numerals. Description of the components illustrated in FIG. 6 will be omitted. The vehicle in FIG. 6 is assumed to be the left-hand drive vehicle illustrated in FIG. 6A (the same applies to the following figures).

As described above, an image of a body part such as an eye of the occupant (driver, etc.) is preferably captured from a position as close as possible to the front. Considering this point, in the example in FIG. 6, a position (position in the height direction of the vehicle) YB at which a principal ray R2 of the imaging light L2 (in this case, irradiation light emitted from the light emitting element 113 toward the windshield 2) is reflected by the windshield (reflective translucent member) 2 is set to be above a position (position in the height direction) YA at which a principal ray R1 of the display light L1 for an image is reflected.

The "principal ray of the imaging light" is, in other words, a principal ray that travels along the "optical axis" of the imaging element (this is referred to as a principal ray). Considering this, "the principal ray R2 of the imaging light L2" can be rephrased as "the optical axis R2 of the imaging element 115".

Thus, "the reflection position YB on the windshield 2 at which the principal ray R2 of the imaging light L2 is reflected" can be rephrased as "the position YB of the intersection of the optical axis R2 of the imaging element 115 and the windshield 2.

For example, the face (particularly, eye) of the person is located above the instrument panel 4 and the steering wheel

8. Thus, by setting, in accordance with the height of the face, eye, or the like, the position YB of the intersection of the optical axis R2 of the imaging light L2 and the windshield 2 to be a position higher than the reflection position YA on the windshield 2 at which the display light L1 for an image is reflected, an image of a body part (e.g., face, eye, etc.) of the person can be captured at an angle closer to the front.

This makes it possible to prevent distortion of a captured image, maintaining a high accuracy in detection of the position of a face or an eye.

Furthermore, the above configuration reliably avoids a situation where imaging light L2 is blocked by the instrument panel 4 or the steering wheel 8 and an image of a body part of the person cannot be captured. This makes it possible to prevent a reduction in reliability of the image capturing function of the HUD device 100.

Next, reference is made to FIG. 7. FIGS. 7A and 7B are diagrams illustrating an effect of blocking external light and line of sight by the filter unit. FIG. 7A illustrates a figure shown above as FIG. 2A. FIG. 7B is a cross-sectional view taken along line A-A in FIG. 7A.

As described with reference to FIG. 2A, the filter unit (may be simply referred to as filter) 114 that transmits infrared light and blocks (or absorbs) visible light is provided below the translucent cover 112 fixed to the housing 116 (or integrated with the housing 116).

The filter unit 114 may be, for example, a multilayer long-path filter composed of a material that absorbs visible light and transmits infrared light (specifically, an IR filter attached to the rear surface of the translucent cover, etc.).

In plan view from above in the height direction of the vehicle, the region (translucent cover region) in which the translucent cover 2 is present includes the filter unit region Z2 corresponding to the filter unit 114 (see, for example, FIG. 3A).

The filter unit region Z2 includes the imaging element region Zr corresponding to the imaging element 115.

The imaging element 115 is disposed at a position corresponding to the filter unit 114. As illustrated in FIG. 7B, the filter unit 114 is provided above (on the upper side of) the imaging element 115 in the housing 116 of the HUD device 100 so as to cover the imaging element 115.

In other words, a layout configuration is adopted in which the filter unit region Z2 corresponding to the filter unit 114 includes the imaging element region Zr in plan view of the translucent cover 112 from above.

In FIG. 7B, α represents a range (angle range) in which imaging light (infrared light) is emitted, and β represents a range (angle range) in which reflected light (returning light) of the imaging light (infrared light) reflected by a body part of the person is incident.

Thus, in the cross-sectional structure of the housing 116, the filter unit 114 is present above the imaging element 115. Therefore, as illustrated in FIG. 7B, external light incident on the translucent cover 112 from above (e.g., external light coming via the windshield 2; indicated by a thick dashed arrow in FIG. 7B) is blocked by the filter unit 114. This makes it possible to prevent a reduction in imaging accuracy due to external light.

Similarly, the line of sight of the person (driver 5, etc.) from above (indicated by a thick dashed arrow in FIG. 7B) is blocked by the filter unit 114. This makes it possible to prevent the person from feeling unpleasant due to visual recognition of components (in other words, a reduction in marketability of the HUD device 100).

Next, reference is made to FIG. 8. FIGS. 8A to 8C are diagrams illustrating an example of a preferred arrangement of the light emitting element (light emitting element region) and the imaging element (imaging element region), considering stray light generated on the translucent cover (or the filter unit provided below the translucent cover).

FIG. 8A illustrates a figure shown above as FIG. 2A. FIG. 8B is a cross-sectional view taken along line A-A in FIG. 8A, and FIG. 8C is a cross-sectional view of a comparative example (an example adopting a layout in which the positions of the light emitting element and the imaging element are reversed).

As illustrated in FIG. 8A, in plan view from above, the image capturing unit 110 is located on the left side as viewed from the driver 5 (on the end side of the vehicle 1) with respect to the display light passing region Z1.

In other words, not only the imaging element (camera) 115 but also the light emitting element (solid-state image sensor such as a CCD, etc.) 113 is located on the left side as viewed from the driver 5 (on the end side of the vehicle 1) with respect to the display light passing region Z1.

The light emitting element region Ze is provided on the end side of the vehicle 1 (the side of the vehicle 1 opposite to the center side) with respect to the display light passing region z1. In other words, "the light emitting element region Ze" is disposed on the same side as "the imaging element region Zr" (on the end side of the vehicle with respect to the display light passing region z1). This layout configuration has, for example, an effect of allowing the light emitting element 113 and the imaging element 115 disposed close to each other to be handled as a single image capturing unit 110. Specifically, the light emitting element 113 and the imaging element 115 housed as a single unit in a single package are easier to handle than the elements individually handled.

When the light emitting element 113 and the imaging element 115 are individually installed, the relative positions of the elements may vary. The elements installed as a single unit have an advantage in that a deviation in the relative positions of the elements is determined by the accuracy of the layout of the elements in a manufacturing process of the single unit, and does not depend on a positional deviation during mounting of the elements.

Furthermore, the imaging element 115 and the light emitting element 113 are disposed close to each other along the front-rear direction of the vehicle 1. The imaging element 115 is disposed on the side (front side) closer to the windshield 2, and the light emitting element 113 is disposed on the side (rear side) closer to the steering wheel 8 (or the driver 5).

This layout can reduce the adverse effect of stray light N2 as illustrated in FIG. 8B.

As illustrated in FIG. 8B, the translucent cover 112 has an arc curved surface shape (partial arc shape) protruding downward in a cross section along the front-rear direction of the vehicle. The partial arc shape is inclined so that the height position of the end of the partial arc shape on the rear side is higher than the height position of the end of the partial arc shape on the front side.

Furthermore, the light emitting element 113 and the imaging element 115 are both inclined rearward (rightward in FIG. 8B with respect to the height direction of the vehicle (Y direction), and the light emitting element 113 emits imaging light upward and rearward (obliquely rightward and upward in FIG. 8B).

In FIG. 8B, α represents a range (angle range) in which imaging light (infrared light) is emitted, and β represents a range (angle range) in which reflected light (returning light) of the imaging light (infrared light) reflected by a body part of the person is incident.

As illustrated in FIG. 8B, part of the imaging light emitted from the light emitting element 113 is reflected by the translucent cover 2 (or the filter unit 114 provided below the translucent cover). Thus, stray light N1 and stray light N2 are generated. The problem here is the stray light N2. The stray light N2 is generated by reflection of part of the pencil of imaging light at a position closest to the imaging element.

However, in FIG. 8B, the stray light N2 travels outside the range β in which light is received by the imaging element 115, thus sufficiently reducing the effect of the stray light N2 on reception of light (capturing of an image) by the imaging element 115.

If the positions of the light emitting element 113 and the imaging element 116 are reversed as illustrated in FIG. 8C, stray light N4 may directly return to the imaging element 115. This may lead to a lower S/N for capturing an image.

Thus, the configuration in FIG. 8A is a layout configuration in which a measure is taken for stray light generated by reflection of part of the imaging light on the translucent cover.

Next, reference is made to FIG. 9. FIGS. 9A to 9C are diagrams illustrating another example of the preferred arrangement of the light emitting element (light emitting element region) and the imaging element (imaging element region), considering stray light generated on the translucent cover (or the filter unit provided below the translucent cover).

FIG. 9A illustrates a figure shown above as FIG. 2B. FIG. 9B is a cross-sectional view taken along line B-B in FIG. 9A, and FIG. 9C is a cross-sectional view of a comparative example (an example adopting a layout in which the positions of the light emitting element and the imaging element are reversed).

In FIG. 9A, the light emitting element (light source unit) 113 and the imaging element (camera) 115 are disposed close to each other along the width direction of the vehicle (lateral direction). FIG. 9A differs from FIG. 8A in this regard.

As illustrated in FIG. 9A, in plan view from above, the image capturing unit 110 is located on the left side as viewed from the driver 5 (on the end side of the vehicle 1) with respect to the display light passing region Z1. As described above with reference to FIG. 8A, the configuration has an advantage in that the elements can be handled as a single unit.

In FIG. 9B, stray light N5 and stray light N6 are generated. The problem here is the stray light N6. However, the stray light N6 travels outside the range in which light is incident on the imaging element 115. This makes it possible to sufficiently prevent a reduction in imaging accuracy due to the stray light N6.

If the positions of the light emitting element 113 and the imaging element 115 are reversed as illustrated in FIG. 9C, stray light N6 is likely to return to the light receiving surface of the imaging element 115. This may lead to a reduction in imaging accuracy.

Thus, as in FIG. 8A, the configuration in FIG. 9A is a layout configuration in which a measure is taken for stray light generated by reflection of part of the imaging light on the translucent cover.

Second Embodiment

Next, reference is made to FIG. 10. FIG. 10A is a diagram illustrating an example in which the light emitting element (light emitting element region) is disposed on the right side of the display light passing region as viewed from the driver and the imaging element (imaging element region) is disposed on the left side of the display light passing region as viewed from the driver, and FIG. 10B is a diagram illustrating an effect of preventing stray light.

In the example in FIG. 10A, in plan view from above in the height direction of the vehicle, the region of the translucent cover 112 provided on the housing 116 includes the light emitting element region Ze corresponding to the light emitting element 113 located below the translucent cover 112.

The light emitting element region Ze is provided on the center side of the vehicle (in other words, on the side of the vehicle opposite to the side (the end side of the vehicle) on which the imaging element 115 is provided) in the width direction of the vehicle with respect to the display light passing region Z1 as viewed from the driver (occupant in a broad sense).

The display light passing region Z1 is present between the light emitting element 113 and the imaging element 115; thus, a large space is provided between the elements accordingly.

FIG. 10B is a cross-sectional view taken along line C-C in FIG. 10A. As illustrated in FIG. 10B, a layout configuration is adopted in which a path (three-dimensional space corresponding to a pencil of light) Ea through which display light (visible light) passes is interposed between the light emitting element 113 and the imaging element 115 in a three-dimensional space.

The layout in plan view from above (planar layout) is a layout configuration in which the display light (visible light) passing region Z1 is interposed between the light emitting element region Ze and the imaging element region Zr.

As can be seen from FIGS. 10A and 10B, the light emitting element region Ze is disposed on the side opposite to the imaging element region Zr (on the center side of the vehicle) with respect to the display light passing region Z1. The display light passing region Z1 is present between the light emitting element region Ze and the imaging element region Zr; thus, a large space is provided between the light emitting element region Ze and the imaging element region Zr accordingly.

As illustrated in FIG. 10B, when imaging light emitted from the light emitting element 113 is reflected by the translucent cover 112 (or the filter unit 114) provided on the housing 116, stray light N9 and stray light N10 are generated. In particular, if the stray light N10 is incident on the imaging element 115, the stray light N10 causes an imaging error.

However, as illustrated in FIG. 10B, the light emitting element 113 and the imaging element 115 are disposed apart from each other, sufficiently preventing the stray light N10 from being incident on the imaging element 115. Thus, the layout configuration in FIG. 10 is useful as a measure against stray light.

In some cases, the light emitting element 113 and the imaging element 115 disposed apart from each other may lead to a larger amount of imaging light reflected by a body part of the person and returned to the imaging element as compared with the case where the elements 113 and 115 are disposed on the same side. The layout configuration in FIG. 10B is also useful to achieve a more flexible layout of the elements according to the situation.

Third Embodiment

Next, reference is made to FIG. 11. FIG. 11 is a diagram illustrating an example of a layout configuration using first and second light emitting elements.

As illustrated in FIG. 11, in plan view from above in the height direction of the vehicle, the region (rectangular region indicated by a thick solid line in FIG. 11; translucent cover region) of the translucent cover 112 provided on the housing 116 includes the light emitting element region Ze corresponding to the light emitting element 113 located below the translucent cover 112.

The HUD device 100 in FIG. 11 includes a first light emitting element 113a and a second light emitting element 113b as light emitting elements.

Accordingly, the layout configuration includes, as the light emitting element region Ze, a first light emitting element region Zea that corresponds to the first light emitting element 113a, and a second light emitting element region Zeb that corresponds to the second light emitting element 113b.

Furthermore, as the filter unit (and the filter unit region), a first filter unit 114a (first filter unit region Z2a) and a second filter unit 114b (second filter unit region Z2b) are separately provided.

The first light emitting element region Zea is provided on the center side of the vehicle (the right side; the upper side in FIG. 11) in the width direction of the vehicle with respect to the display light passing region Z1 as viewed from the driver 5.

The second light emitting element region Zeb is provided on the end side of the vehicle (the left side; the lower side in FIG. 11) opposite to the center side of the vehicle in the width direction of the vehicle with respect to the display light passing region Z1 as viewed from the driver 5.

In the example in FIG. 11, the light emitting element to be used can be selectively switched between the first light emitting element 113a and the second light emitting element 113b, or the light emitting elements 113a and 113b can be simultaneously used to emit light.

The first light emitting element 113a (and the first light emitting element region Zea) is provided on the center side of the vehicle (on the right side as viewed from the driver 5) with respect to the display light passing region Z1. The second light emitting element 113b (and the second light emitting element region Zeb) is provided on the end side of the vehicle (on the left side as viewed from the driver) with respect to the display light passing region Z1.

In other words, the display light passing region Z1 is present between the first light emitting element 113a and the second light emitting element 113b; thus, the elements are installed at considerably different positions with a large space therebetween.

Therefore, for example, it is possible to allow an optical path (first optical path) in which imaging light emitted from the first light emitting element 113a is reflected by the windshield 2 and a body part (face, eye, etc.) of the person 5 is irradiated with the light to be different from an optical path (second optical path) in which imaging light emitted from the second light emitting element 113b is reflected by the windshield 2 and a body part (face, eye, etc.) of the person 5 is irradiated with the light.

Considering this point, switching the light emitting element to be used between the two light emitting elements (imaging light sources) 113a and 113b as appropriate or using the two light emitting elements (imaging light sources) 113a and 113b in combination is highly likely to reduce the adverse effect of stray light that is likely to be generated, for example, when the person (driver) 5 wears sunglasses.

In some cases, for example, reflection (diffuse reflection, etc.) of imaging light different from normal may occur on the surface of sunglasses that the driver 5 wears, and reflected light different from normal of the imaging light may be reflected by the windshield 2 and returned to the imaging element. In such a case, the light does not pass through a normal optical path, and this may cause an increase in distortion of an image.

In this case, as described above, by switching the light emitting element to be used between the two light emitting elements (imaging light sources) or by using the two light emitting elements (imaging light sources) in combination, it is possible to slightly change the optical path (in other words, the incident angle) of imaging light with which a body part of the person is irradiated or to change the cross-sectional shape of a pencil of light with which a body part of the person is irradiated or increase the area of the cross-sectional shape. This may reduce the stray light.

For example, the incident angle of returning stray light on the imaging element may be changed, and the stray light is less likely to be sensed. Furthermore, normal (regular) returning light may be increased, achieving a better S/N.

Thus, the configuration in FIG. 11 may be used as a measure against stray light, for example, when the person (driver) wears sunglasses or the like.

The configuration in FIG. 11 is also useful to increase the amount of imaging light returning to the imaging element to improve detection sensitivity.

Fourth Embodiment

Next, reference is made to FIG. 12. FIG. 12 is a diagram illustrating another example of the layout configuration using the first and second light emitting elements.

As illustrated in FIG. 12, in plan view from above in the height direction of the vehicle, the region Z0 (rectangular region indicated by a thick solid line in FIG. 12; translucent cover region) of the translucent cover 112 provided on the housing 116 includes the light emitting element region Ze corresponding to the light emitting element 113 located below the translucent cover 112.

The HUD device 100 in FIG. 12 includes the first light emitting element 113a and the second light emitting element 113b as light emitting elements.

The first light emitting element 113a and the second light emitting element 113b are provided as components of a light emitting element unit 117.

Accordingly, the layout configuration includes, as the light emitting element region Ze, the first light emitting element region Zea that corresponds to the first light emitting element 113a, and the second light emitting element region Zeb that corresponds to the second light emitting element 113b.

Furthermore, as the filter unit (and the filter unit region), the first filter unit 114a (first filter unit region Z2a) and the second filter unit 114b (second filter unit region Z2b) are separately provided.

The first light emitting element 113a and the second light emitting element 113b (and the first light emitting element region Zea and the second light emitting element region Zeb) are disposed close to each other along the width direction of the vehicle (lateral direction) on the center side of the vehicle (the upper side in FIG. 12) with respect to the display light passing region Z1 as viewed from the driver (occupant) 5.

However, the second light emitting element region Zeb corresponding to the second light emitting element 113a is provided at a position farther from the display light passing region Z1 than the first light emitting element region Zea. In FIG. 12, "D1" represents the distance (distance in the width direction of the vehicle) from the display light passing region Z1 to the first light emitting element region Zea, and "D2" represents the distance from the display light passing region Z1 to the second light emitting element region Zeb, and the distances are set so that D2>D1.

As in the example in FIG. 11, the configuration of the example in FIG. 12 includes the first light emitting element (imaging light source) 113a and the second light emitting element (imaging light source) 113b, and by switching the light emitting element to be used between the two light emitting elements or by using the two light emitting elements in combination, the configuration can be used as a measure against stray light or used to increase the amount of imaging light returning to the imaging element. For example, the configuration has an advantage in that the combined use of the first light emitting element 113a and the second light emitting element 113b disposed close to each other effectively increases the amount of light emitted in the same direction.

Furthermore, the space between the first light emitting element 113a and the second light emitting element 113b, and the like, can be finely adjusted as appropriate.

As described above, the embodiments of the present invention achieve, in a head-up display device having a function of displaying an image (virtual image) and a function of capturing an image of a body part (eye, etc.) of an occupant, a reduction in distortion of a captured image and an improvement in accuracy in detection of the body part.

Furthermore, the embodiments of the present invention can prevent an increase in size of a housing of the head-up display device.

Herein, the term "vehicle" can also be interpreted as a conveyance in a broad sense. Furthermore, the terms (e.g., sign, etc.) related to navigation are interpreted in a broad sense, considering, for example, the viewpoint of navigation information in a broad sense that is useful for vehicle operation. Furthermore, the HUD device and the display unit device (and display device in a broad sense) include a device used as a simulator (e.g., an aircraft simulator, a simulator as a game device, etc.).

The present invention is not limited to the above exemplary embodiments, and those skilled in the art can readily modify the above exemplary embodiments within the scope of the claims.

DESCRIPTION OF REFERENCE NUMERALS

1 Vehicle
2 Windshield (reflective translucent member)
4 Instrument panel (or dashboard)
5 Occupant (driver, etc.)
7 Body part (face, eye, etc.) of person as imaging target
8 Steering wheel
102 Display unit
104 Display panel (liquid crystal display device, etc.)
106 Plane mirror
108 Curved mirror (concave mirror, etc.)
100 HUD device
110 Imaging unit (image capturing unit)
112 Translucent cover
113 Light emitting element (infrared light emitting diode, etc.)
114 Filter unit (filter that transmits infrared light and blocks visible light)
115 Imaging element (solid-state image sensor such as CCD; camera in a broad sense)

116 Housing

L1 Display light for image (visible light)

L2 Imaging light (infrared light; irradiation light with which body part of person is irradiated)

L3 Reflected light reflected by body part of person

Z0 Translucent cover region

Z1 Display light passing region

Z2 Filter unit region

Ze Light emitting element region

Zr Imaging element region

The invention claimed is:

1. A head-up display device that displays a virtual image to an occupant of a vehicle by irradiating, with display light for an image, a reflective translucent member provided in the vehicle and having both light reflecting and light transmitting properties, captures an image of a body part of the occupant by irradiating the body part with imaging light and receiving reflected light from the body part via the reflective translucent member, and is disposed between the occupant and the reflective translucent member in plan view from above in a height direction of the vehicle, the head-up display device comprising:

a housing;

a translucent cover that is provided on the housing;

a display unit that is provided in the housing and displays the image;

an optical system that is provided in the housing and includes an optical element that irradiates the reflective translucent member with the display light via the translucent cover; and an imaging unit that is provided outside a path of the display light for an image in the housing and includes a light emitting element that emits the imaging light and an imaging element that receives the reflected light coming via the reflective translucent member, wherein in plan view from above in the height direction of the vehicle, the housing is disposed between a position at which the occupant is seated and the reflective translucent member, a region of the translucent cover provided on the housing includes a display light passing region in which the display light is allowed to pass through, and an imaging element region that corresponds to the imaging element located below the translucent cover, and the imaging element region is provided on an end side of the vehicle opposite to a center side of the vehicle in a width direction of the vehicle with respect to the display light passing region as viewed from the occupant.

2. The head-up display device according to claim 1, wherein the display light is visible light, and the imaging light is infrared light, the head-up display device comprises a filter unit that is provided below the translucent cover and that transmits infrared light and blocks visible light, in plan view from above in the height direction of the vehicle, the region of the translucent cover includes a filter unit region that corresponds to the filter unit, and the filter unit region includes the imaging element region.

3. The head-up display device according to claim 1, wherein an intersection of an optical axis of the imaging element and the reflective translucent member is located above a reflection point on the reflective translucent member at which a principal ray of the display light is reflected.

4. The head-up display device according to claim 1, wherein in plan view from above in the height direction of the vehicle, the region of the translucent cover provided on the housing includes a light emitting element region that corresponds to the light emitting element located below the translucent cover, and the light emitting element region is provided on the end side of the vehicle opposite to the center side of the vehicle in the width direction of the vehicle with respect to the display light passing region as viewed from the occupant.

5. The head-up display device according to claim 1, wherein in plan view from above in the height direction of the vehicle, the region of the translucent cover provided on the housing includes a light emitting element region that corresponds to the light emitting element located below the translucent cover, and the light emitting element region is provided on the center side of the vehicle in the width direction of the vehicle with respect to the display light passing region as viewed from the occupant.

6. The head-up display device according to claim 1, wherein in plan view from above in the height direction of the vehicle, the region of the translucent cover provided on the housing includes a light emitting element region that corresponds to the light emitting element located below the translucent cover, the head-up display device comprises first and second light emitting elements as the light emitting element, the light emitting element region includes a first light emitting element region that corresponds to the first light emitting element, and a second light emitting element region, the first light emitting element region is provided on the center side of the vehicle in the width direction of the vehicle with respect to the display light passing region as viewed from the occupant, and the second light emitting element region is provided on the end side of the vehicle opposite to the center side of the vehicle in the width direction of the vehicle with respect to the display light passing region as viewed from the occupant.

7. The head-up display device according to claim 1, wherein in plan view from above in the height direction of the vehicle, the region of the translucent cover provided on the housing includes a light emitting element region that corresponds to the light emitting element located below the translucent cover, the head-up display device comprises first and second light emitting elements as the light emitting element,

US 12,661,984 B2

25 the light emitting element region includes a first light emitting element region that corresponds to the first light emitting element, and a second light emitting element region, the first light emitting element region is provided on the center side of the vehicle in the width direction of the vehicle with respect to the display light passing region as viewed from the occupant, and the second light emitting element region is provided at a position that is located on the center side of the vehicle in the width direction of the vehicle with respect to the display light passing region as viewed from the occupant and that is located farther from the display light passing region than the first light emitting element region in such a manner that a distance from the display light passing region to the second light emitting element region is larger than a distance from the display light passing region to the first light emitting element region in the width direction of the vehicle.

* * * * *